(12) United States Patent
Webster et al.

(10) Patent No.: US 8,606,548 B2
(45) Date of Patent: Dec. 10, 2013

(54) ENERGY FACILITY CONTROL SYSTEM

(75) Inventors: Andrew Sebastian Webster, Pearlan, TX (US); Adam Glenn Hess, Charlotte, NC (US); Keith E. Kowal, Philadelphia, PA (US); John Ciecholewski, Skokie, IL (US)

(73) Assignee: Accenture Global Services Limited, Dublin (IE)

( * ) Notice: Subject to any disclaimer, the term of this patent is extended or adjusted under 35 U.S.C. 154(b) by 304 days.

(21) Appl. No.: 12/965,483

(22) Filed: Dec. 10, 2010

(65) Prior Publication Data

US 2011/0224953 A1 Sep. 15, 2011

Related U.S. Application Data

(60) Provisional application No. 61/285,447, filed on Dec. 10, 2009.

(51) Int. Cl.
| | |
|---|---|
| G06F 17/50 | (2006.01) |
| G06G 7/54 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl.
USPC .................. 703/1; 703/18; 715/221; 715/224

(58) Field of Classification Search
USPC .................. 703/1; 700/286, 30; 715/221, 224
See application file for complete search history.

(56) References Cited

U.S. PATENT DOCUMENTS

| | | | |
|---|---|---|---|
| 5,970,437 A * | 10/1999 | Gorman et al. ............... | 702/184 |
| 6,169,967 B1 | 1/2001 | Dahlem et al. | |
| 7,269,569 B2 | 9/2007 | Spira et al. | |
| 7,293,230 B2 | 11/2007 | Bimson et al. | |
| 7,640,225 B2 | 12/2009 | Clater | |
| 7,792,830 B2 | 9/2010 | Carmel et al. | |
| 7,957,991 B2 | 6/2011 | Mikurak | |
| 2002/0013631 A1 | 1/2002 | Parunak et al. | |
| 2003/0014342 A1 | 1/2003 | Vande | |
| 2003/0036820 A1 | 2/2003 | Yellepeddy et al. | |
| 2003/0083912 A1 | 5/2003 | Covington et al. | |
| 2003/0100974 A1 | 5/2003 | Alvarez et al. | |
| 2004/0088202 A1 | 5/2004 | Radigan | |

(Continued)

OTHER PUBLICATIONS

Mun, Duhwan et al., "Sharing Product Data of Nuclear Power Plants Across their Lifecycles by Utilizing a Neutral Model", Aug. 15, 2007, Elsevier Ltd.*

(Continued)

*Primary Examiner* — David Silver
*Assistant Examiner* — Cedric D Johnson
(74) *Attorney, Agent, or Firm* — Fish & Richardson P.C.

(57) ABSTRACT

An energy facility control system transforms the manner in which energy facilities create, modify, share, and store information during all phases of their lifecycles, from licensing through construction and decommissioning. The energy facility control system provides energy operators and their suppliers with collaborative toolsets to help improve accuracy, reliability and efficiency during every stage of an energy facility's lifecycle.

20 Claims, 16 Drawing Sheets

(56) References Cited

U.S. PATENT DOCUMENTS

| | | | |
|---|---|---|---|
| 2006/0117012 A1 | 6/2006 | Rizzolo et al. | |
| 2006/0253310 A1 | 11/2006 | Fuchs et al. | |
| 2008/0047016 A1 | 2/2008 | Spoonamore | |
| 2008/0058969 A1* | 3/2008 | Nixon et al. | 700/87 |
| 2008/0091590 A1 | 4/2008 | Kremen | |
| 2008/0288121 A1 | 11/2008 | Fedosovskiy et al. | |
| 2009/0099832 A1* | 4/2009 | Nasle | 703/18 |
| 2010/0094651 A1 | 4/2010 | Roubein | |
| 2010/0125528 A1* | 5/2010 | Reddy | 705/317 |

OTHER PUBLICATIONS

"Engevix Engenharia Sa Project-wise ROI Study", Bentley Systems, Inc., 2008, 4 pp., http://ftp2.bentley.com/distlcollateral/Web/Platform/Engevix-PW.pdf.

"Assuring quality and nuclear safety", IAEA Bulletin, vol. 23, No. 3, International Symposium on quality assurance for nuclear power plants, Paris, France, May 11-15, 1981, pp. 53-55, http://www.iaea.org/Publications/Magazines/Bulleti_n/Bu_11242/24203515055.pdf.

PCT Notification of Transmittal of the International Search Report and the Written Opinion of the International Searching Authority for International Application No. PCT/US10/59907 dated Feb. 2, 2011 (8 pages).

U.S. Final Office Action for U.S. Appl. No. 12/965,544 dated Jun. 13, 2013, 18 pages.

"Next Generation Nuclear Plant Licensing Strategy, A Report to Congress", Aug. 2008, pp. 1-29.

* cited by examiner

ENERGY FACILITY CONTROL SYSTEM

CROSS REFERENCE TO RELATED APPLICATIONS

The present application claims the benefit of U.S. Provisional Application No. 61/285,447, filed Dec. 10, 2009, which is incorporated herein by reference in its entirety for all purposes.

TECHNICAL FIELD

This disclosure relates to energy facility control systems.

BACKGROUND

Energy facilities may include systems for controlling and managing data. The systems may include several different systems that each performs a specific operation in isolation and without communication with other systems. In addition, the systems may manage data at a document level such that analysis of an entire document is needed to identify any portion of data included in the document.

SUMMARY

Techniques are described for energy facility control and data management.

In one aspect, an energy facility control system includes a database configured to maintain documents that support an energy facility as collections of data objects. Each of the data objects has one or more attributes that classify a type of data stored in the corresponding data object. The documents that support the energy facility including at least a license document that defines a licensing agreement between the energy facility and a regulatory organization and includes a first collection of the data objects that are managed as discrete pieces of data separate from the license document and a design document that defines a design of at least a portion of the energy facility and includes a second collection of the data objects that are managed as discrete pieces of data separate from the design document. The energy facility control system also includes one or more server systems that are configured to access data stored in the database and to perform operations. The operations include reusing data objects among the documents that support the energy facility. The reuse includes reusing, in the license document and the design document, a first data object that includes data describing a component of the energy facility by including the first data object in the first collection of data objects that define the license document, including the first data object in the second collection of data objects that define the design document, and maintaining, in the database, a single stored instance of the first data object that is referenced by each of the license document and the design document. The operations also include processing transactions related to the energy facility using the data objects as opposed to the documents. The processing includes identifying impacted data objects that are relevant to a transaction based on the one or more attributes of each of the data objects. The identified data objects being included in multiple, different documents that support the energy facility. The processing also includes handling the transaction using the identified data objects without accessing all data from the multiple, different documents that support the energy facility.

Implementations may include one or more of the following features. For example, the first data object that includes data describing the component of the energy facility may include a computer-aided-design (CAD) drawing of the component of the energy facility. In this example, the operations may include including the CAD drawing of the component in the first collection of data objects that define the license document such that the CAD drawing of the component is presented in the license document, including the CAD drawing of the component in the second collection of data objects that define the design document such that the CAD drawing of the component is presented in the design document, and maintaining, in the database, a single stored instance of the CAD drawing of the component that is referenced by each of the license document and the design document.

In some examples, the operations may include processing modifications to the first data object by modifying the single stored instance of the first data object that is referenced by each of the license document and the design document. In these examples, the modifications to the first data object may be reflected in each of the license document and the design document based on modification of the single stored instance of the first data object.

In some implementations, the operations may include identifying a transaction related to reusing portions of the license document in another license document that defines a different licensing agreement than the licensing agreement defined by the license document and, in response to identifying the transaction related to reusing portions of the license document in another license document, identifying data objects included in the first collection of data objects that do not pertain to energy facility specific data based on attributes of the first collection of data objects. In these implementations, the operations also may include accessing the identified data objects that do not pertain to energy facility specific data and using the identified data objects that do not pertain to energy facility specific data in handling the transaction related to reusing portions of the license document in another license document.

In some examples, the transaction may be a request to change the component of the energy facility described by the first data object. In these examples, the operations may include isolating, from the license document, a licensed safety margin data object that describes a licensed safety margin that is impacted by the component of the energy facility and isolating, from the design document, a designed safety margin data object that describes a designed safety margin that is impacted by the component of the energy facility. Further, in these example, the operations may include handling the request to change the component of the energy facility using the licensed safety margin data object and the designed safety margin data object.

In some implementations, the transaction may be an adverse condition of the energy facility detected by a corrective action application. In these implementations, the operations may include, based on the one or more attributes of each of the data objects, identifying impacted data objects that are relevant to the adverse condition of the energy facility detected by the corrective action application. The identified data objects may be associated with at least licensing and design operations related to the energy facility and may include at least one data object included in the first collection of data objects and at least one data object included in the second collection of data objects. In addition, in these implementations, the operations may include handling the adverse condition of the energy facility detected by the corrective action application using the identified data objects associated with at least licensing and design operations related to the energy facility.

In some examples, the documents that support the energy facility may include an as licensed system requirements document that defines system requirements needed to comply with the licensing agreement and includes a third collection of the data objects that are managed as discrete pieces of data separate from the as licensed system requirements document, an as designed system requirements document that defines system requirements needed to comply with a design of the energy facility and includes a fourth collection of the data objects that are managed as discrete pieces of data separate from the as designed system requirements document, an as built system requirements document that defines system requirements for the energy facility as built and includes a fifth collection of the data objects that are managed as discrete pieces of data separate from the as built system requirements document, and an as maintained system requirements document that defines system requirements for the energy facility as maintained throughout its lifecycle and includes a sixth collection of the data objects that are managed as discrete pieces of data separate from the as maintained system requirements document. In these examples, the transaction may be a change in the energy facility and the operations may include, based on the one or more attributes of each of the data objects, identifying, from among the third, fourth, fifth, and sixth collections of data objects, impacted data objects that are relevant to the change in the energy facility. The identified data objects may include at least one data object included in the third collection of data objects, at least one data object included in the fourth collection of data objects, at least one data object included in the fifth collection of data objects, and at least one data object included in the sixth collection of data objects. The operations also may include using a configuration management application to, based on the identified data objects, assess impact of the change in the energy facility on the energy facility as licensed, as designed, as built, and as maintained.

In addition, the database may be configured to maintain the documents that support the energy facility as collections of extensible markup language (XML) data objects defined in accordance with an XML schema. The database also may be configured to maintain documents that support a nuclear power plant as collections of data objects, the license document may define a licensing agreement between the nuclear power plant and a nuclear regulatory organization, and the design document may define a design of at least a portion of the nuclear power plant. The operations may include reusing data objects among the documents that support the nuclear power plant and processing transactions related to the nuclear power plant using the data objects as opposed to the documents.

In another aspect, a method includes maintaining, in a database, documents that support an energy facility as collections of data objects. Each of the data objects has one or more attributes that classify a type of data stored in the corresponding data object. The documents that support the energy facility include at least a license document that defines a licensing agreement between the energy facility and a regulatory organization and includes a first collection of the data objects that are managed as discrete pieces of data separate from the license document, and a design document that defines a design of at least a portion of the energy facility and includes a second collection of the data objects that are managed as discrete pieces of data separate from the design document. The method also includes reusing, by one or more server systems, data objects among the documents that support the energy facility. The reuse includes reusing, in the license document and the design document, a first data object that includes data describing a component of the energy facility by including the first data object in the first collection of data objects that define the license document, including the first data object in the second collection of data objects that define the design document, and maintaining, in the database, a single stored instance of the first data object that is referenced by each of the license document and the design document. The method further includes processing, by one or more server systems, transactions related to the energy facility using the data objects as opposed to the documents. The processing includes identifying impacted data objects that are relevant to a transaction based on the one or more attributes of each of the data objects. The identified data objects may be included in multiple, different documents that support the energy facility. The processing also includes handling the transaction using the identified data objects without accessing all data from the multiple, different documents that support the energy facility.

Implementations may include one or more of the following features. For example, the first data object that includes data describing the component of the energy facility may include a computer-aided-design (CAD) drawing of the component of the energy facility. In this example, the method may include including the CAD drawing of the component in the first collection of data objects that define the license document such that the CAD drawing of the component is presented in the license document, including the CAD drawing of the component in the second collection of data objects that define the design document such that the CAD drawing of the component is presented in the design document, and maintaining, in the database, a single stored instance of the CAD drawing of the component that is referenced by each of the license document and the design document.

In some examples, the method may include processing modifications to the first data object by modifying the single stored instance of the first data object that is referenced by each of the license document and the design document. In these examples, the modifications to the first data object may be reflected in each of the license document and the design document based on modification of the single stored instance of the first data object.

In some implementations, the method may include identifying a transaction related to reusing portions of the license document in another license document that defines a different licensing agreement than the licensing agreement defined by the license document and, in response to identifying the transaction related to reusing portions of the license document in another license document, identifying data objects included in the first collection of data objects that do not pertain to energy facility specific data based on attributes of the first collection of data objects. In these implementations, the method also may include accessing the identified data objects that do not pertain to energy facility specific data and using the identified data objects that do not pertain to energy facility specific data in handling the transaction related to reusing portions of the license document in another license document.

In some examples, the transaction may be a request to change the component of the energy facility described by the first data object. In these examples, the method may include isolating, from the license document, a licensed safety margin data object that describes a licensed safety margin that is impacted by the component of the energy facility and isolating, from the design document, a designed safety margin data object that describes a designed safety margin that is impacted by the component of the energy facility. Further, in these example, the method may include handling the request to change the component of the energy facility using the licensed safety margin data object and the designed safety margin data object.

In some implementations, the transaction may be an adverse condition of the energy facility detected by a corrective action application. In these implementations, the method may include, based on the one or more attributes of each of the data objects, identifying impacted data objects that are relevant to the adverse condition of the energy facility detected by the corrective action application. The identified data objects may be associated with at least licensing and design operations related to the energy facility and may include at least one data object included in the first collection of data objects and at least one data object included in the second collection of data objects. In addition, in these implementations, the method may include handling the adverse condition of the energy facility detected by the corrective action application using the identified data objects associated with at least licensing and design operations related to the energy facility.

In some examples, the documents that support the energy facility may include an as licensed system requirements document that defines system requirements needed to comply with the licensing agreement and includes a third collection of the data objects that are managed as discrete pieces of data separate from the as licensed system requirements document, an as designed system requirements document that defines system requirements needed to comply with a design of the energy facility and includes a fourth collection of the data objects that are managed as discrete pieces of data separate from the as designed system requirements document, an as built system requirements document that defines system requirements for the energy facility as built and includes a fifth collection of the data objects that are managed as discrete pieces of data separate from the as built system requirements document, and an as maintained system requirements document that defines system requirements for the energy facility as maintained throughout its lifecycle and includes a sixth collection of the data objects that are managed as discrete pieces of data separate from the as maintained system requirements document. In these examples, the transaction may be a change in the energy facility and the method may include, based on the one or more attributes of each of the data objects, identifying, from among the third, fourth, fifth, and sixth collections of data objects, impacted data objects that are relevant to the change in the energy facility. The identified data objects may include at least one data object included in the third collection of data objects, at least one data object included in the fourth collection of data objects, at least one data object included in the fifth collection of data objects, and at least one data object included in the sixth collection of data objects. The method also may include using a configuration management application to, based on the identified data objects, assess impact of the change in the energy facility on the energy facility as licensed, as designed, as built, and as maintained.

In addition, the database may be configured to maintain the documents that support the energy facility as collections of extensible markup language (XML) data objects defined in accordance with an XML schema. The database also may be configured to maintain documents that support a nuclear power plant as collections of data objects, the license document may define a licensing agreement between the nuclear power plant and a nuclear regulatory organization, and the design document may define a design of at least a portion of the nuclear power plant. The method may include reusing data objects among the documents that support the nuclear power plant and processing transactions related to the nuclear power plant using the data objects as opposed to the documents.

In yet another aspect, at least one computer-readable storage medium is encoded with executable instructions that, when executed by at least one processor, cause the at least one processor to perform operations. The operations include maintaining, in a database, documents that support an energy facility as collections of data objects. Each of the data objects has one or more attributes that classify a type of data stored in the corresponding data object. The documents that support the energy facility include at least a license document that defines a licensing agreement between the energy facility and a regulatory organization and includes a first collection of the data objects that are managed as discrete pieces of data separate from the license document, and a design document that defines a design of at least a portion of the energy facility and includes a second collection of the data objects that are managed as discrete pieces of data separate from the design document. The operations also include reusing, by one or more server systems, data objects among the documents that support the energy facility. The reuse includes reusing, in the license document and the design document, a first data object that includes data describing a component of the energy facility by including the first data object in the first collection of data objects that define the license document, including the first data object in the second collection of data objects that define the design document, and maintaining, in the database, a single stored instance of the first data object that is referenced by each of the license document and the design document. The operations further includes processing, by one or more server systems, transactions related to the energy facility using the data objects as opposed to the documents. The processing includes identifying impacted data objects that are relevant to a transaction based on the one or more attributes of each of the data objects. The identified data objects may be included in multiple, different documents that support the energy facility. The processing also includes handling the transaction using the identified data objects without accessing all data from the multiple, different documents that support the energy facility.

Implementations may include one or more of the following features. For example, the first data object that includes data describing the component of the energy facility may include a computer-aided-design (CAD) drawing of the component of the energy facility. In this example, the operations may include including the CAD drawing of the component in the first collection of data objects that define the license document such that the CAD drawing of the component is presented in the license document, including the CAD drawing of the component in the second collection of data objects that define the design document such that the CAD drawing of the component is presented in the design document, and maintaining, in the database, a single stored instance of the CAD drawing of the component that is referenced by each of the license document and the design document.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

An energy facility control system transforms the manner in which energy facilities create, modify, share, and store information during all phases of their lifecycles, from licensing through construction and decommissioning. The energy facility control system provides energy operators and their suppliers with collaborative toolsets to help improve accuracy, reliability and efficiency during every stage of an energy facility's lifecycle.

In some implementations, the energy facility control system uses an integrated, data-centric approach to data management that integrates data from all aspects of energy facility operation throughout the lifecycle of the energy facility. In these implementations, data is maintained at an object level, rather than a document level. In this regard, data objects can be reused in multiple documents with relative ease and without redundant storage of the data. In addition, data objects that are relevant to a specific transaction (or proposed transaction) associated with the energy facility are quickly accessed and used to handle the transaction without the need to consider and evaluate aspects of documents that support the energy facility that are not relevant to the transaction. Based on the integration and data format, the energy facility control system may easily share relevant data between all applications involved in the lifecycle of the energy facility and assess the impact of a transaction on all aspects of the energy facility. For instance, the energy facility control system may evaluate the impact of transactions (e.g., adverse conditions detected by a corrective action system, proposed replacement of parts, etc.) of an operating energy facility on license agreements and design specifications by identifying data objects included in license and design documents that are relevant to the transactions.

Figure 1:
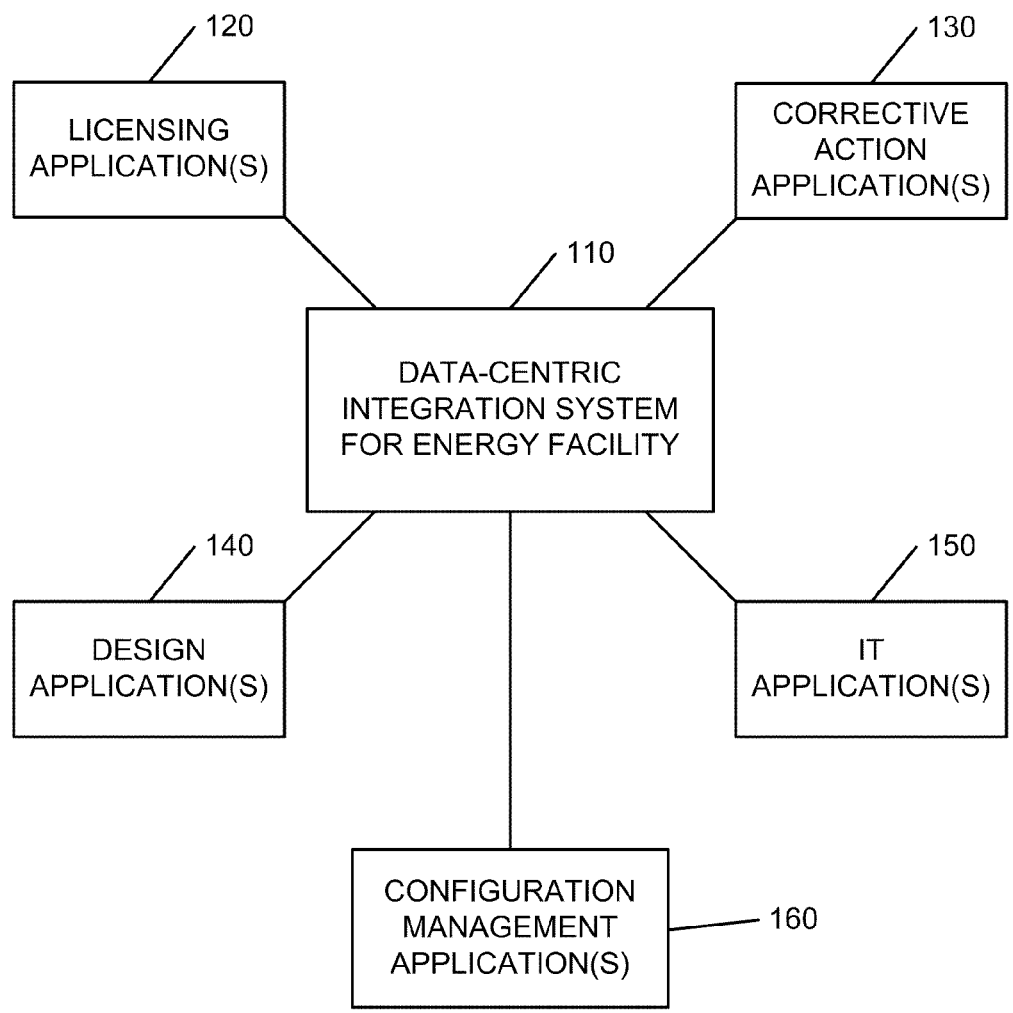
FIGS. 1, 5, and 16 are diagrams of example systems.

FIG. 1 illustrates an example energy facility control system 100. The energy facility control system 100 includes a data-centric integration system 110, one or more licensing applications 120, one or more corrective action applications 130, one or more design applications 140, one or more information technology (IT) applications 150 and one or more configuration management applications 160. The data-centric integration system 110 maintains data for the energy facility control system 100 and coordinates exchange of data between the various applications included in the energy facility control system 100.

The data-centric integration system 110 may include one or more data stores (e.g., databases) that store data for the energy facility control system 100. The data-centric integration system 110 may store data for the energy facility as data objects (e.g., extensible markup language (XML) data objects), rather than as documents. Specifically, the energy facility facilitate may have many different documents that support operation of the energy facility. For instance, the energy facility may have license documents that define licensing agreements with regulatory organizations that oversee operation of the energy facility, design documents that define design specifications of the energy facility, system requirements documents that detail operational aspects of the energy facility, etc. Instead of storing the documents that support operation of the energy facility at the document level, the system 110 stores data objects that include data in the documents and manages the data objects as discrete pieces of data separate from the documents. In this regard, each document is represented by a collection of data objects (e.g., many data objects) maintained by the system 110 that the corresponding document references when the entire document or a portion of the document (e.g., a chapter) is needed. The data objects may represent paragraphs, sentences, words, images, computer-aided-design files, or any other piece of data included in a document. The data objects may be reused in multiple, different documents to avoid redundant storage of data common to multiple documents. The data objects are stored with one or more (perhaps many) attributes (e.g., metadata) that classify the type of data represented by the data object and that allow quick retrieval of data objects with attributes relevant to a particular action associated with the energy facility.

The data-centric integration system 110 may include one or more server systems (e.g., servers, computers, other types of electronic data processing apparatuses, etc.) that manage the data stored in the system 110. The system 110 may control storage of data objects and corresponding attribute information and may coordinate sharing of data between the various applications included in the system 100. The system 110 may search for data objects based on the attribute information associated with the data objects and locate relevant data objects that pertain to or are impacted by a particular action associated with the energy facility. By searching for discrete data objects (rather than searching at a document level), the system 110 is able to quickly identify relevant data from documents associated with any of the various applications included in the system 100 and provide only the portions of the documents that are relevant to the action.

The one or more licensing applications 120 perform licensing related operations for the energy facility. The licensing operations may involve license agreements with regulatory organizations (e.g., government agencies) that oversee operation of the energy facility. For instance, the licensing applications 120 may manage license documents that govern operation of the energy facility and may monitor data collected by the system 110 to ensure compliance with the license documents.

The one or more corrective action applications 130 monitor conditions at the energy facility (e.g., proper operation of components, proper operating environment, such as temperature and pressure, etc.). The corrective action applications 130 evaluate the monitored conditions to detect conditions adverse to the energy facility and facilitate corrective action needed to address detected conditions adverse to the energy facility.

The one or more design applications 140 perform design related operations for the energy facility. The design operations may involve designs of portions (or the entire) energy facility and specifications that need to be met to comply with the design. For instance, the design applications 140 may manage design documents that represent a design of at least a portion of the energy facility and may monitor data collected by the system 110 to ensure compliance with the design documents.

The one or more IT applications 150 provide IT support for the energy facility. The IT applications 150 may control dispatch and provision of IT services to support the various applications included in the system 100.

The one or more configuration management applications 160 evaluate operations of the energy facility at various stages of the lifecycle of the energy facility and ensure consistency of approach taken at each stage of the lifecycle of the energy facility. For example, the configuration management applications 160 may consider requirements for the energy facility as licensed, requirements for the energy facility as designed, requirements for the energy facility as built, and requirements for the energy facility as maintained and ensure that the requirements are consistent and comply with all phases of the lifecycle of the energy facility. In this example, when a proposed change is being considered, the configuration management applications 160 evaluate the proposed change with respect to all phases of the lifecycle of the energy facility and determine whether the proposed change complies with requirements for all phases of the lifecycle of the energy facility. The configuration management applications 160 uses the data collected and maintained by the system 110 to ensure consistency and approach throughout the lifecycle of the energy facility.

As discussed above, the system 110 integrates data collected by all of the applications (e.g., applications 120, 130, 140, 150, 160, and any other applications) of the energy facility control system 100. The system 110 enables consideration of data from all of the applications of the energy facility control system 100 in determining actions to perform and assessing changes to the energy facility. Accordingly, changes or transactions in one area of the energy facility are informed to other areas of the energy facility and easily assessed from the perspective of the other areas. In addition, changes or transactions are assessed against past and future plans for the energy facility to ensure a consistent approach that complies with all license and design specifications. For example, an adverse condition detected by the corrective action applications 130 may be evaluated by the licensing applications 120 to determine whether any action related to the adverse condition needs to be taken in view of licensing agreements (e.g., reporting of the adverse condition, replacement of a component responsible for the adverse condition, etc.). In another example, a proposed change in design for a built energy facility made by the design applications 140 may be assessed by the configuration management applications 160 to ensure the proposed change complies with the system requirements defined as the energy facility was originally designed. As these examples illustrate, the system 110 enables sharing of data throughout the energy facility control system 100 and any actions in one application are considered and assessed by all of the other applications included in the energy facility control system 100.

Figure 2:
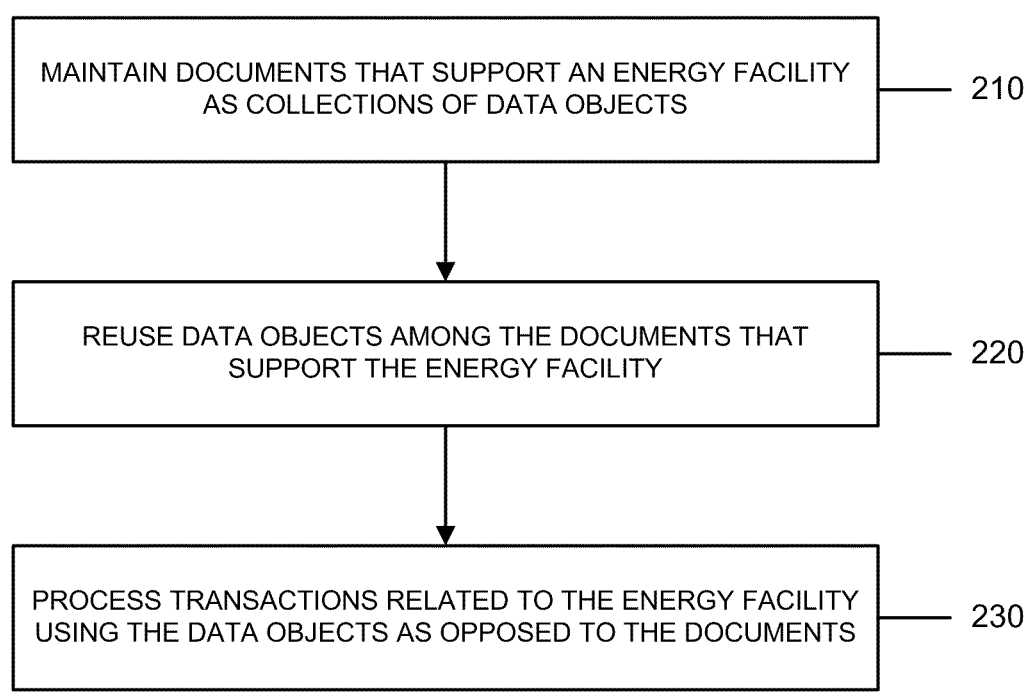
FIGS. 2 and 6 to 13 are flowcharts of example processes.

FIG. 2 illustrates an example process 200 for managing an energy facility control system. The operations of the process 200 are described generally as being performed by the system 100. The operations of the process 200 may be performed by any one or more components of the system 100 or may be performed by the system 110. In some implementations, operations of the process 200 may be performed by one or more processors included in one or more electronic devices.

The system 100 maintains documents that support an energy facility as collections of data objects (210). For example, the system 100 maintains data objects in a database and manages the data objects as discrete pieces of data. In this example, a document references a collection of the data objects, rather than having a file or other representation of the entire document. The system 100 may maintain extensible markup language (XML) data objects defined in accordance with an XML schema.

Each of the data objects managed by the system 100 may have one or more attributes that classify a type of data stored in the corresponding data object. For instance, the attributes may identify that a data object relates to a safety margin, pertains to a particular component (e.g., pump, valve, etc.), is not specific to a particular energy facility, or any other type of classification that may be appropriate for the data stored in the data object. The attributes for data objects may be predefined to include metadata needed to appropriately classify the data stored in the data object and enable retrieval of the data object when the data stored in the data object is needed.

In some implementations, the documents that support the energy facility may include a license document that defines a licensing agreement between the energy facility and a regulatory organization. The license document may include a first collection of the data objects that are managed as discrete pieces of data separate from the license document. In these implementations, the documents also may include a design document that defines a design of at least a portion of the energy facility. The design document may include a second collection of the data objects that are managed as discrete pieces of data separate from the design document. The second collection of data objects is different than the first collection of data objects, but some data objects may be included in both the first collection and the second collection.

The system 100 reuses data objects among the documents that support the energy facility (220). For example, because the documents maintained by the system 100 reference data objects, the data objects may be reused in multiple, different applications. In this example, the system 100 may store single instances of the data objects and merely reference the single instances of the data objects in each document. This may avoid redundant storage of data and facilitate reuse of data in different aspects of the energy facility. In addition, the system 100 may process modifications to data objects by modifying the single stored instances of the data objects such that the modifications to the data objects are reflected in each of the documents in which the data objects appear. In this manner, when a change to a piece of data included in multiple documents is needed, the system 100 makes a single change to the data object and does not have to replicate the change in files for the multiple documents.

In some examples, the system 100 may reuse, in the license document and the design document maintained by the system 100, a first data object that includes data describing a component of the energy facility. In these examples, the system 100 may include the first data object in the first collection of data objects that define the license document by referencing the first data object in a license document definition. The system 100 also may include the first data object in the second collection of data objects that define the design document by referencing the first data object in a design document definition. Despite the first data object being included in the license document and the design document, the system 100 maintains, in the database, a single stored instance of the first data object that is referenced by each of the license document and the design document.

The first data object that includes data describing the component of the energy facility may be a computer-aided-design (CAD) drawing of the component of the energy facility. In this example, the CAD drawing is managed as a discrete drawing that is reproduced in the license document and the design document. Changes in the CAD drawing are automatically reflected in the license document and the design document because, when a representation of the license document and/or the design document is needed, the current version of the CAD drawing is accessed and included in the representation.

The system 100 process transactions related to the energy facility using the data objects as opposed to the documents (230). For example, the system 100 does not evaluate data at the document level when processing transactions, but instead directly evaluates the data objects that make up the documents. In this example, the system 100 is able to quickly and easily retrieve data from the documents that is relevant to the transaction being processed because the system 100 only identifies the relevant data objects (e.g., only the relevant portions of the documents).

In some implementations, the system 100 identifies impacted data objects that are relevant to a transaction based on attributes stored for each of the data objects. The identified data objects may be included in multiple, different documents that support the energy facility and cover multiple, different aspects of energy facility lifecycle (e.g., licensing, design, etc.). In these implementations, the system 100 handles the transaction using the identified data objects without accessing all data from the multiple, different documents that support the energy facility. In this regard, the system 100 focuses on and isolates only the relevant pieces of the documents and, thereby, avoids accessing entire documents that include additional data (perhaps a great deal of additional data) that is irrelevant to the transaction being processed.

In some examples, the system 100 may identify a transaction related to reusing portions of the license document in another license document that defines a different licensing agreement than the licensing agreement defined by the license document. For instance, a user may want to prepare a new license document based on a proposed change to the energy facility or may want to prepare a similar license document for a different energy facility. In these examples, the system 100 identifies data objects included in the license document that do not pertain to energy facility specific data based on attributes of the collection of data objects that make up the license document (e.g., each of the data objects may include one or more attributes that indicate whether the data object stores energy facility specific data and the system 100 filters out data objects that are labeled as storing energy facility specific data). The system 100 then accesses the identified data objects that do not pertain to energy facility specific data and uses the accessed data objects that do not pertain to energy facility specific data in handling the transaction related to reusing portions of the license document in another license document. For instance, the system 100 may prepare a shell license document using the accessed data objects. By enabling identification of data objects that do not pertain to energy facility specific data, the system 100 may promote reuse of data throughout documents that support the energy facility or other related energy facilities.

As another example of processing transactions related to the energy facility using the data objects as opposed to the documents, the transaction may be a request to change a component of the energy facility described by the data object included in a license document and a design document. In this example, the system 100 isolates, from the license document, a licensed safety margin data object that describes a licensed safety margin that is impacted by the component of the energy facility and isolates, from the design document, a designed safety margin data object that describes a designed safety margin that is impacted by the component of the energy facility. The system 100 then handles the request to change the component of the energy facility using the licensed safety margin data object and the designed safety margin data object. For instance, the system 100 may present the licensed safety margin and the designed safety margin to the employee requesting the change to enable the employee to determine whether the proposed change complies with the licensed safety margin and the designed safety margin without having to review the entire license document and design document to find the relevant safety margins. The system 100 also may determine the impact on safety margin for the proposed change, compare the impact to the licensed safety margin and the designed safety margin, and send an alert indicating results of the comparison. When the comparison reveals that the proposed violates one or both of the licensed safety margin and the designed safety margin, the system 100 may send an alert that rejects the proposed change and indicates which safety margin is violated by the proposed change. When the comparison reveals that the proposed complies with both of the licensed safety margin and the designed safety margin, the system 100 may send an alert that accepts the proposed change and indicates that the proposed change complies with the licensed safety margin and the designed safety margin.

As yet another example of processing transactions related to the energy facility using the data objects as opposed to the documents, the transaction may be an adverse condition of the energy facility detected by a corrective action application. In this example, the system identifies impacted data objects that are relevant to the adverse condition of the energy facility detected by the corrective action application based on attributes of each of the data objects. The identified data objects may be associated with licensing and design operations related to the energy facility and one or more of the identified data objects may be included in a license document and/or a design document for the energy facility. In this example, the system 100 handles the adverse condition of the energy facility detected by the corrective action application using the identified data objects associated with licensing and design operations related to the energy facility. For instance, the system 100 may determine whether any action related to the adverse condition is needed based on a license agreement (e.g., reporting the adverse condition to a regulatory agency) and whether any action related to the adverse condition is needed based on design specifications (e.g., change of a component that is responsible for the adverse condition).

As a further example of processing transactions related to the energy facility using the data objects as opposed to the documents, the documents that support the energy facility may include an as licensed system requirements document that defines system requirements needed to comply with a licensing agreement for the energy facility, an as designed system requirements document that defines system requirements needed to comply with a design of the energy facility, an as built system requirements document that defines system requirements for the energy facility as built, and an as maintained system requirements document that defines system requirements for the energy facility as maintained throughout its lifecycle. Each of the system requirements may be defined by a different collection of data objects that may or may not overlap. In this example, the transaction may be a change in the energy facility and the system 100 may identify, from among the collections of data objects that make up the as licensed system requirements document, the as designed system requirements document, the as built system requirements document, and the as maintained system requirements document, impacted data objects that are relevant to the change in the energy facility. The system 100 then may use a configuration management application to, based on the identified data objects, assess impact of the change in the energy facility on the energy facility as licensed, as designed, as built, and as maintained. In this regard, the system 100 may ensure the change complies with all phases of the lifecycle of the energy facility and that a consistent approach is taken throughout the lifecycle of the energy facility.

Figure 3:
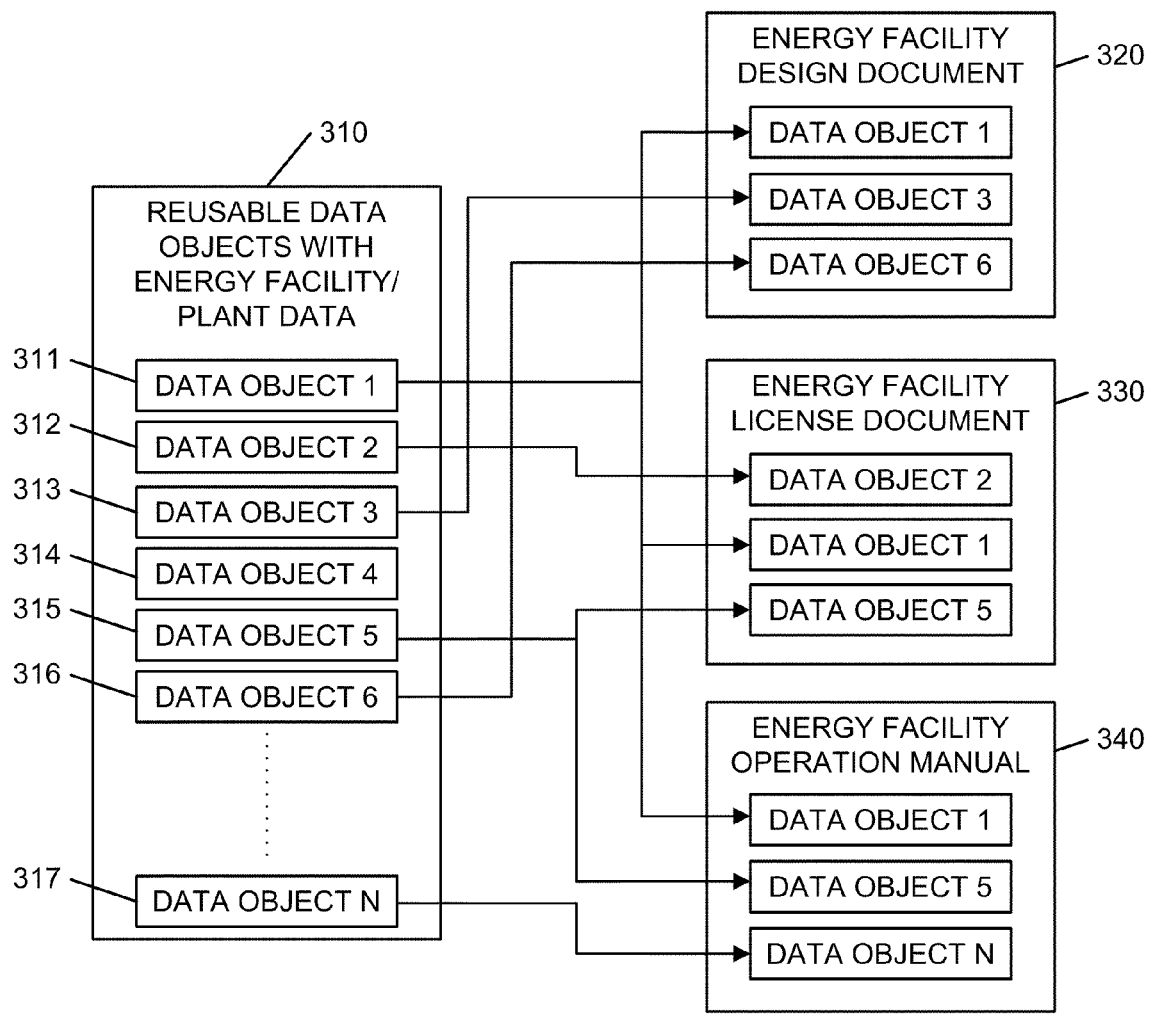
FIG. 3 is a diagram of an example of reusing data objects in documents that support an energy facility.

FIG. 3 illustrates an example of reusing data objects in documents that support an energy facility. As shown in FIG.

3, a database 310 includes several reusable data objects 311, 312, 313, 314, 315, 316, and 317. The database 310 may be part of the system 110 described above with respect to FIG. 1. The reusable data objects 311, 312, 313, 314, 315, 316, and 317 store data relevant to an energy facility (e.g., nuclear power plant) and may be used in documents that support the energy facility. The reusable data objects 311, 312, 313, 314, 315, 316, and 317 may represent paragraphs, sentences, words, images, computer-aided-design files, or any other piece of data included in a document. For brevity, only seven data objects have been illustrated. In actual implementations, the database 310 may include many more data objects than shown.

Collections of the reusable data objects 311, 312, 313, 314, 315, 316, and 317 may be referenced to define documents that support the energy facility. As shown in FIG. 3, the energy facility includes a design document 320, a license document 330, and an operation manual 340. For brevity, only three documents have been illustrated. In actual implementations, the energy facility may include many more documents than shown.

The design document 320 defines a design of at least a portion of the energy facility and includes a collection of reusable data objects from the database 310. As shown, the design document 320 includes data object one 311, data object three 313, and data object six 316. In this example, the data object one 311 may be a CAD drawing of a component (e.g., a pump, valve, etc.) included in the design of the energy facility, the data object three 313 may be text describing the component, and the data object six 316 may be text describing a safety margin for the component. For brevity, only three data objects have been illustrated as making up the design document 320. In actual implementations, the design document 320 may include many more data objects than shown.

The license document 330 defines a licensing agreement for the energy facility and includes a collection of reusable data objects from the database 310. As shown, the license document 330 includes data object one 311, data object two 312, and data object five 315. In this example, the data object one 311 may be the CAD drawing of the component (e.g., a pump, valve, etc.) included in the design of the energy facility, the data object two 312 may be text describing parameters of the license agreement, and the data object five 315 may be text describing a licensed safety margin for the component. As shown, the data object one 311 is reused from the design document 320 in the license document 330 and positioned in a different order than its position in the design document 320. Only a single instance of the data object one 311 is stored in the database 310 and referenced by each of the design document 320 and the license document 330. For brevity, only three data objects have been illustrated as making up the license document 330. In actual implementations, the license document 330 may include many more data objects than shown.

The operation manual 340 is a manual for operating at least a portion of the energy facility and includes a collection of reusable data objects from the database 310. As shown, the operation manual 340 includes data object one 311, data object five 315, and data object N 317. In this example, the data object one 311 may be the CAD drawing of the component (e.g., a pump, valve, etc.) included in the design of the energy facility, the data object five 315 may be the text describing a licensed safety margin for the component, and the data object N 317 may be text describing how the component should be operated to meet the licensed safety margin for the component. As shown, the data object one 311 is reused from the design document 320 in the operation manual 340. Only a single instance of the data object one 311 is stored in the database 310 and referenced by each of the design document 320, the license document 330, and the operation manual 340. Further, the data object five 315 is reused from the license document 330 in the operation manual 340. Only a single instance of the data object five 315 is stored in the database 310 and referenced by each of the license document 330 and the operation manual 340. For brevity, only three data objects have been illustrated as making up the operation manual 340. In actual implementations, the operation manual 340 may include many more data objects than shown.

Figure 4:
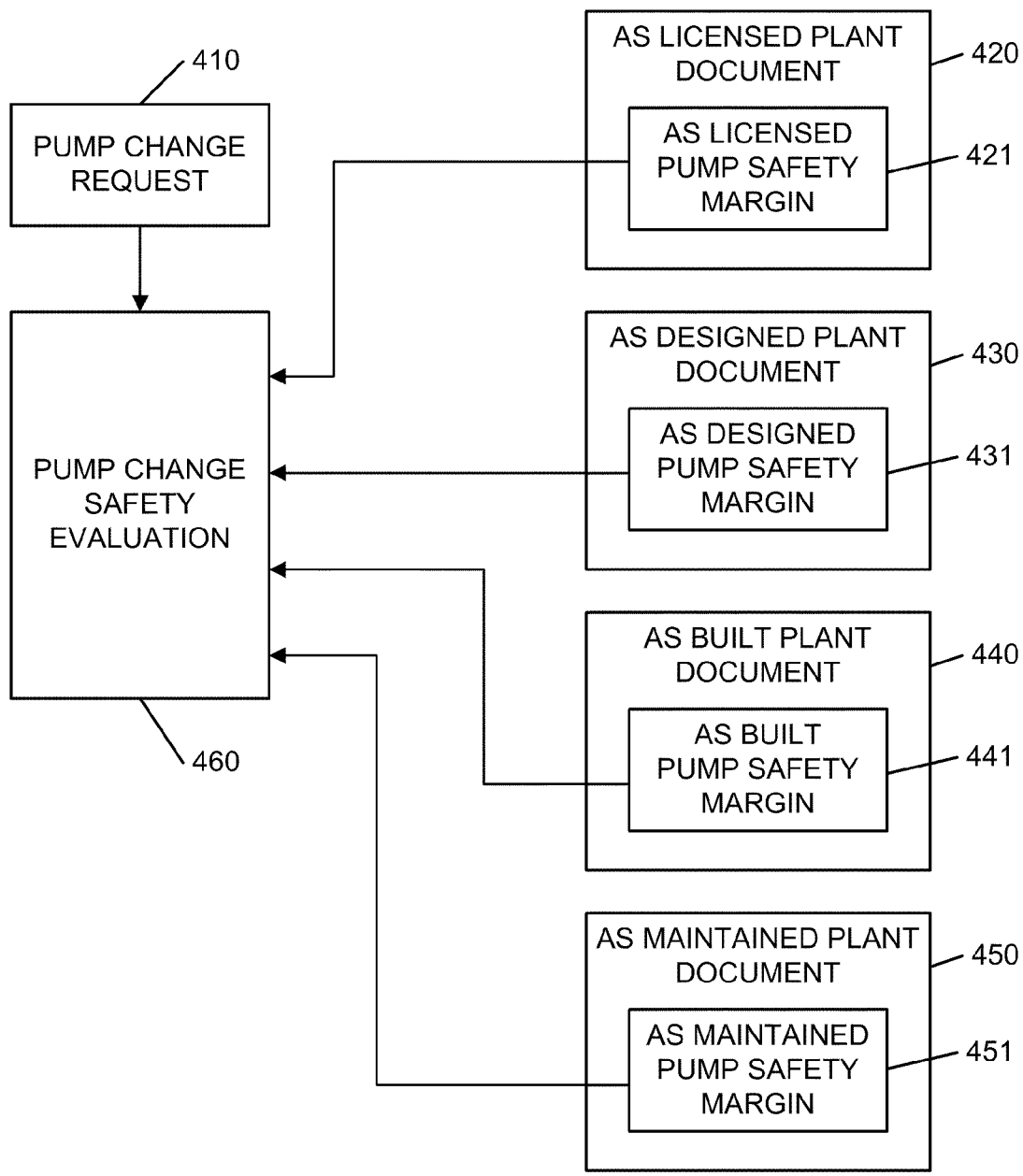
FIG. 4 is a diagram of an example of processing transactions in an energy facility.

FIG. 4 illustrates an example of processing transactions in an energy facility. As shown in FIG. 4, an energy facility control system for the energy facility receives a request 410 to change a pump used in the energy facility. In response to the request 410, the energy facility control system takes action to assess the safety impact of the requested change in pump. Accordingly, the energy facility control system searches for data objects that are relevant to evaluating safety of the pump. As shown in FIG. 4, the energy facility control system identifies an as licensed safety margin data object 421 included in an as licensed plant requirements document 420, an as designed safety margin data object 431 included in an as designed plant requirements document 430, an as built safety margin data object 441 included in an as built plant requirements document 440, and an as maintained safety margin data object 451 included in an as maintained plant requirements document 450. The energy facility control system directly accesses the as licensed safety margin data object 421, the as designed safety margin data object 431, the as built safety margin data object 441, and the as maintained safety margin data object 451 without accessing all of the information included in the as licensed plant requirements document 420, the as designed plant requirements document 430, the as built plant requirements document 440, and the as maintained plant requirements document 450. Using the data objects 421, 431, 441, and 451, the energy facility control system performs a pump change safety evaluation 460. For instance, the pump change safety evaluation 460 may present the safety margin information included in all of the data objects 421, 431, 441, and 451 to a user to enable the user to assess the impact the pump change would have on safety of the energy facility as licensed, as designed, as built, and as maintained. In addition, for the pump change safety evaluation 460, the energy facility control system may evaluate a change in safety margin that would occur based on the pump change against the safety margins stored in the data objects 421, 431, 441, and 451 and determine whether the pump change complies with the safety of the energy facility as licensed, as designed, as built, and as maintained.

In some examples, an energy facility control system provides an enterprise platform solution that transforms the manner in which nuclear energy facilities create, modify, share, and store information during all phases of their 60-year-plus lifecycles, from licensing through construction and decommissioning. In these examples, the energy facility control system is unique in that it is the only information and knowledge-management platform that provides nuclear energy operators and their suppliers with collaborative toolsets to help improve accuracy, reliability and efficiency during every stage of a nuclear energy facility's lifecycle.

In some implementations, the energy facility control system may provide continuous reduction in delivery risk, including loss of design/licensing basis control and synchronization with constructor and owner. In addition, the energy facility control system may provide continuous productivity and quality improvement, including automation of manual design processes and electronic design/configuration management. Further, the energy facility control system may provide cost structure containment, including efficiency of change process and interoperability with supplier eco-system. In some aspects, the energy facility control system may provide advantages in providing long term services, including maintenance of plant data model and CM and long term Capital and O&M services. Also, the energy facility control system may provide additional plant design/build contracts, including competitive advantage versus other NSSS.

Figure 5:
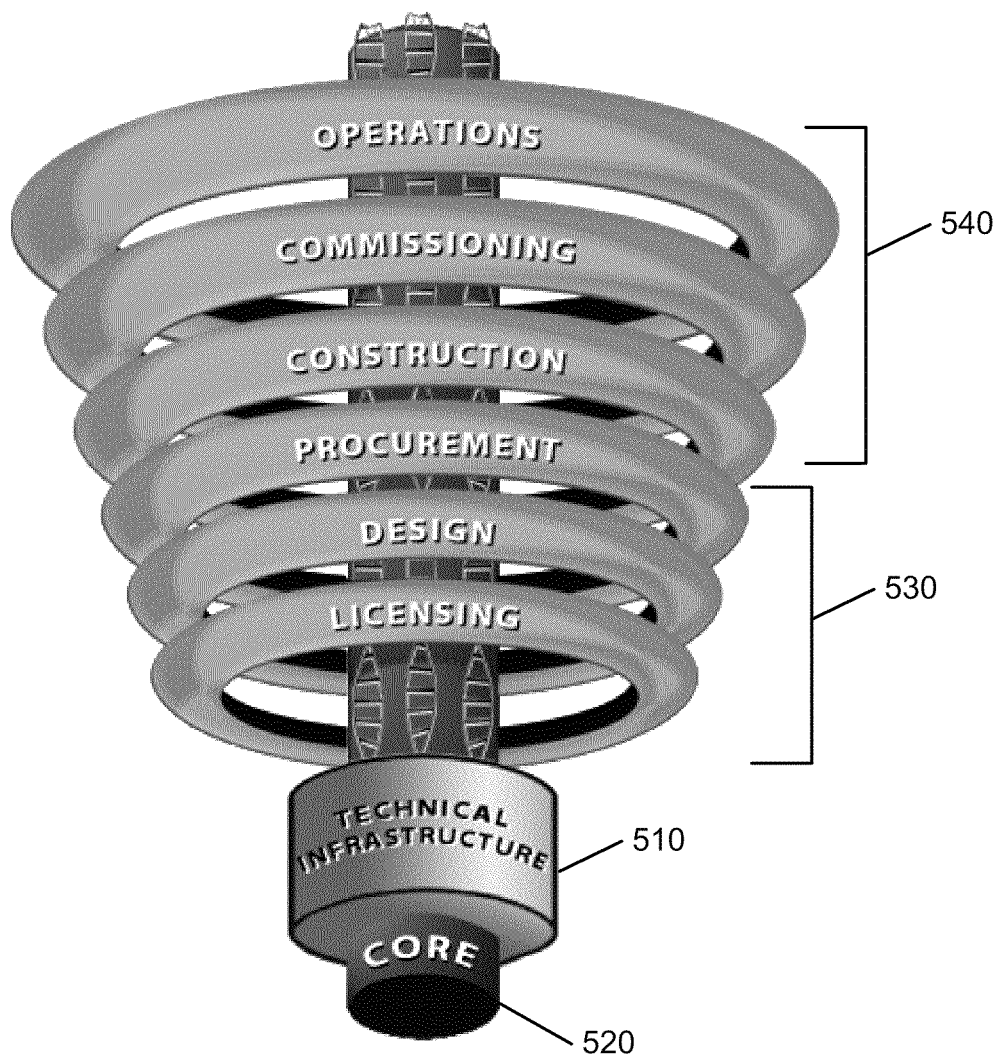

FIG. 5 illustrates an example scope of an energy facility control system. As shown, the energy facility control system includes a technical infrastructure 510. The technical infrastructure 510 provides foundation for the core and all functional layers. The technical infrastructure 510 includes independent/redundant data centers, independent IT architecture, robust inter-co security capability, and documents and records retention and storage design (e.g., to nuclear quality assurance standards). The technical infrastructure 510 leverages design templates described throughout this disclosure as Solution Construction Aids (SCA).

In the example shown in FIG. 5, the energy facility control system is built on core principles and requirements 520. The core principles and requirements 520 include lifecycle data management, lifecycle configuration management (for single plant and fleet), intra and inter-company collaboration, multi-company interoperability, and standards of connectivity. The core 520 captures and manages the "Plant DNA" (e.g., license and design bases) over the plant lifecycle to ensure synchronization of the design and license with the as-is built plant.

In the example shown in FIG. 5, the energy facility control system includes initial functional layers and interfaces 530 that are related to licensing, design, and procurement processes of plant development. The initial functional layers and interfaces 530 include licensing and related regulatory processes (e.g., Request for Additional Information, Problem Identification and Resolution, Inspections, Tests, Analyses, and Acceptance Criteria). The initial functional layers and interfaces 530 also include design interoperability (e.g., Owner, Reactor Vendor, EPC) and owner's acceptance. The initial functional layers and interfaces 530 further include engineering scope book management and cross-company project management. In addition, the initial functional layers and interfaces 530 include system, structure, component-linked equipment reliability and regulatory interfaces and interoperability.

In the example shown in FIG. 5, the energy facility control system includes subsequent functional layers and interfaces 540 that are related to plant construction, commissioning, and operations. The subsequent functional layers and interfaces 540 include non-US licensing and regulatory programs, enterprise resource planning (e.g., Finance, Procurement, Human Resources), and work and asset management. The subsequent functional layers and interfaces 540 also include training and human performance, project risk management, and company-specific programs.

The "Core Platform" shown in FIG. 5 enables life cycle knowledge management, collaboration and interoperability. These features enable the system to manage and maintain the "Plant & Fleet DNA."

Figure 6:
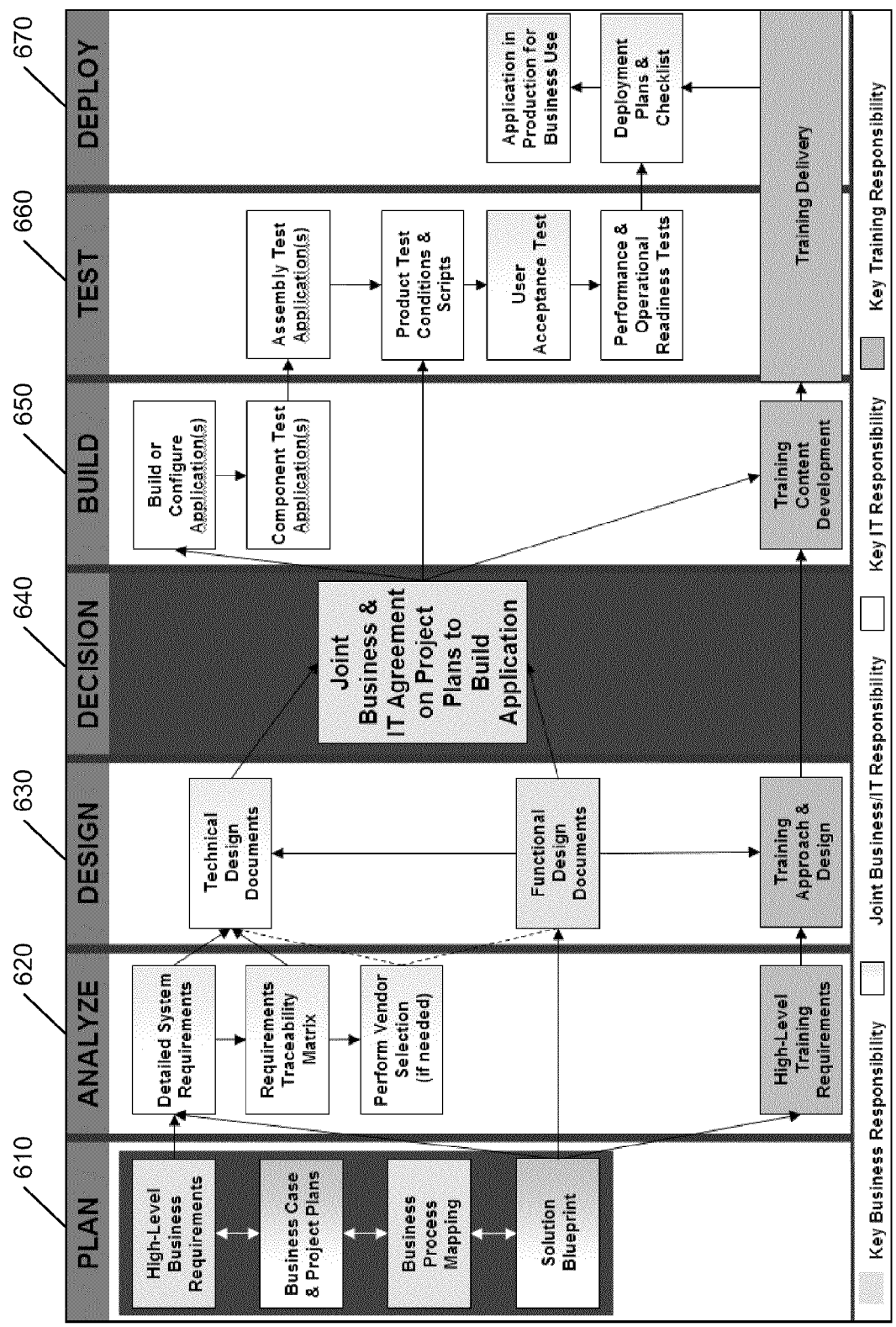

FIG. 6 illustrates an example of operations performed in a system development life cycle. As shown in FIG. 6, the system development life cycle includes a planning phase 610, an analysis phase 620, a design phase 630, a decision phase 640, a build phase 650, a test phase 660, and a deploy phase 670. In the process shown in FIG. 6, a vision is established and objectives are set to realize the vision. Critical Success Factors (CSFs) and Mission Critical Initiatives (MCIs) are identified to achieve each objective by stage of plant development. With management approval, super-users are used to establish business processes. Business, technical capabilities and training requirements are identified to enable the process. Further, benefits and costs and ways to reduce implementation risks are identified based on the capability requirements and processes by stage of plant development. TIC approval is gained based on business case and project plan, and approval is obtained from commitments and board on annual basis.

In some implementations, the energy facility control systems described throughout this disclosure improve the reliability of the EPR. In these implementations, an energy facility control system may provide fewer surprises through improved data, process, reporting and information sharing. For example, the central monitoring capability is expected to find, hold or prevent equipment performance issues; outage planners have more complete information on current and historical equipment condition and reliability; these same outage planners have exceptional access to plant data and design; potential Corrective Action Items and history may be more completely integrated to the plant data model; and lessons learned across the fleet may produce a significant "fleet effect" because all plant configurations and data are stored using the same data stores.

There are many instances for the system to be leveraged to support reliability improvements. Some examples include:
1) Individual plant within the EPR fleet—leveraging system tools around plant performance and reliability data, and the AP913 processes to implement maintenance strategies that improve equipment reliability. Integration of real-time monitoring systems with work management and reliability systems provide an opportunity to extend beyond preventive maintenance practices to implement predictive maintenance strategies.
2) EPR fleet—integrating individual plant performance data described above across multiple plants and developing fleet wide maintenance strategies to improve overall fleet performance. Companies may develop specific offerings for system or component-based maintenance programs based on fleet-wide data. AP913 is extended to support fleet-wide monitoring and advisories. It is also extended to incorporate long term service providers.
3) Plants outside the EPR fleet—since it would be unlikely that these plants would convert their existing information infrastructure to the described systems, other offerings would leverage the data and processes in the system to deliver high quality services at reduced risk. For example, planning for plant outage activities may leverage the system to develop maintenance procedures, parts, work packages, etc. In addition, the reliability and design processes in the system may be leveraged to perform the client specific work activities.

In some examples, specific regulatory processes may be unique to some jurisdictions (e.g., countries) that are not applicable to others. To accommodate different regulations, the system supports new or additional workflows to support specific business processes. For example Canada has multi-step licensing process (as opposed to a single step in the US). Also, ITAAC is a US NRC requirement that may, or may not, be adopted by other countries. However, each country has a design/construction verification process so the work done for ITAAC is leveraged in those areas. Some countries may also have different reporting or inspection requirements that are built into system workflows. Key system capabilities, such as supporting NQA-1 compliance, incorporating NEI SNPM and AP Standards and other best practice methodologies for Problem Identification and Reporting/Corrective Action Programs, provide a strategic advantage in supporting nuclear programs in multiple jurisdictions (e.g., countries).

In some aspects, the system may share both configuration management changes as well as lessons learned. National and international data protocols and export compliance may be considered and accounted for in the sharing of information. In addition, localization of application user interfaces, reports and shared content, such as lessons learned, may be performed based on the plant location.

In terms of application architecture, the energy facility control systems described throughout this disclosure may include a "full scope" approach sequenced by plant lifecycle phase, but also taking into consideration potential variant deployments. For example, project partners may require financial data via data exchange versus deploying the system's financial application to them. In this scenario, the partners may retain their choice of financial applications.

As part of the system blueprint, an initial view of potential applications are identified to support the many business functions required during EPC and plant operations. The applicable application landscape may evolve and applications may be selected in response to business need. For example, a work management application may be integrated when a need arises.

The system blueprint discussed throughout this disclosure establishes principles for system components at many levels as identified below. These principles represent preferred direction or practice. For example, first level principles may include:

- Defined level of service—All Business Solutions are designed to a defined level of service
- Standardization—Strive for standardization across business processes, solutions and technologies that enable them
- Position IT for competitive advantage—Buy for competitive parity and build for competitive advantage.
- Promote reuse—Technology components and standards to facilitate component reuse
- Treat information as enterprise asset—Value information as an enterprise asset, which is shared to enhance and accelerate decision making
- Planned evolution with effective governance—Unify the planning and management of the system enterprise architecture to have a planned evolution that is governed across the enterprise with appropriate technology standards
- Centralize IT assets—Centralize the infrastructure and operations of all system supported enterprise applications (e.g., computer operations, network management, etc.) around a few centralized locations (e.g., data centers)
- Rationalize to reduce IT spend—Rationalize existing technologies and solutions to reduce/minimize IT spend
- Maintain architecture integrity—Use architecture support and review structures to ensure that the integrity of the architecture is maintained as systems and infrastructure are acquired, developed and enhanced Further principles are defined at a second level for architecture and a third level for business architecture, application architecture, and information architecture.

In some examples, the energy facility control systems described throughout this disclosure include a number of integration points with applications and infrastructure managed outside of the system. In these examples, the system may include integration points that enable integration with applications and infrastructure such as:

- I&C data is provided to the plant data historian, and the work management, clearance/tagging, and equipment reliability applications.
- Integration with the plant simulator is provided to support training and configuration management requirements.
- Integration with the plant security, access control, and radiation monitoring infrastructure is provided by applications supporting these processes.
- Structured data from third party equipment and service providers is provided to support procurement, contract and cost management.
- Integration with external data service providers (e.g., licensing research data) and other external information sources (e.g., operator experiences) is accomplished with network connectivity and potentially data and/or process integration.

In some implementations, the energy facility control systems described throughout this disclosure may perform master data management. In these implementations, the system provides configuration management for the fleet to include more plant information and lifecycle phases than traditionally done in nuclear plants in an enterprise manner (e.g., licensing basis to design basis, 3D model and training content, I&C designs and plant simulator, etc.). This higher level of configuration management may improve quality, and reduce costs and project duration. To enable this higher level of configuration management, system enabled capabilities include:

- Centralized plant/product data management system, which is used to make up-to-date BOMB and all related data, visible—and accessible with authorization, security, and version controls—to the appropriate people involved in any lifecycle phase
- Automated workflow enabling configuration management processes across departments and suppliers (as needed) such as engineering change review and approval as well as notifications
- Creating a generic plant structure that can be used to manage all of the configurations that apply to a specific plant and across plants within the fleet, including variants, that facilitate an effective capability to drive standardization across plants
- Integration and configuration management of plant/product data in conjunction with MRO capabilities for servicing existing assets (e.g., "as-licensed", "as-designed", "as-maintained" information)

In addition, the energy facility control systems described throughout this disclosure may include internal interfaces. Although the applications included in the system are rationalized to reduce integration and support costs, many integrations points are needed such as:

- from Design/CAD tools to other Engineering applications (e.g., calculations) and Teamcenter
- from suppliers to Teamcenter for design content, supplier data, etc.
- between EAM and ERP applications (e.g., settlement of work orders)
- between Training and EAM and/or Scheduling (e.g., worker qualifications)
- between ERP and Scheduling (e.g., worker schedules/availability)
- from Time Entry to Work Management and ERP
- real-time data from the plant I&C systems to the data historian, work management, etc.
- from various applications to the system portal
- from various applications to the system data warehouse and reporting In some examples, the energy facility control systems described throughout this disclosure may support web service based integration. For instance, new items and related metadata, datasets and tracelinks may be created in a product lifecycle management (PLM) application (e.g., Teamcenter) using a collection of item related services. This application support of web services is just one element of an effective service oriented integration architecture.

The system also may include service oriented architecture services related to end user enhancement requests and customer integration for DDE deliverables. These services may include support for connectivity and authentication services, message routing, transformation, formatting, scheduling, and error handling.

The service oriented architecture used by the system may be modeled based on reference architecture models and the system blueprint described throughout this disclosure. The system may have a unified and simplified approach to integration to ensure control over integration end-points, provide easier access to information, better respond to changing business needs, improve business process flexibility, improve quality of information, and better leverage resources.

Figure 7:
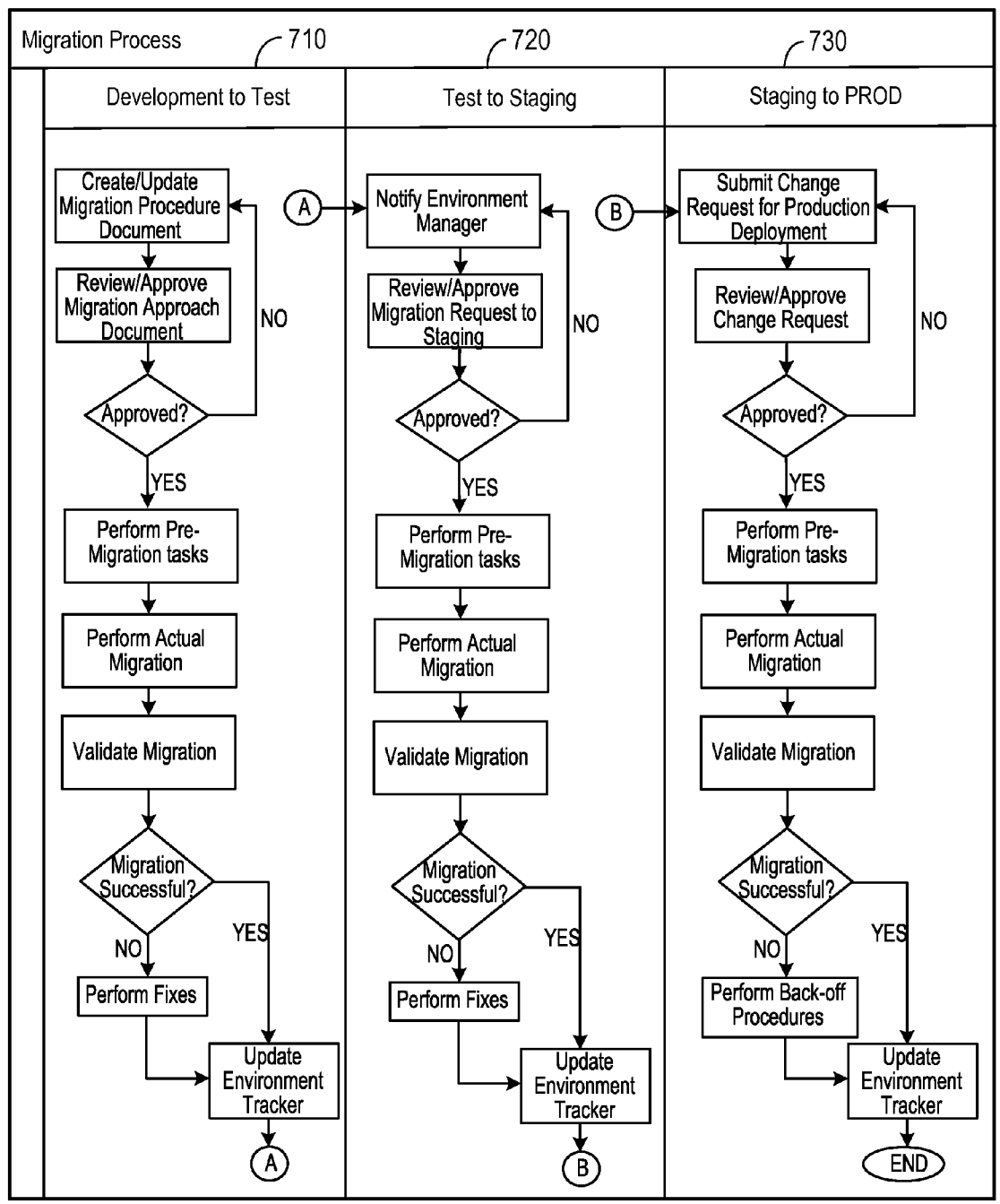

In the energy facility control systems described throughout this disclosure, application environments may be created and managed in the system including development, test, staging, production, backup and training. For development and testing, multiple environments may exist for some applications to better support and control concurrent development and testing activities. Also, depending on the application development architecture supported by each application, some additional differences may exist between applications. FIG. 7 illustrates the migration process flow from development to test 710, test to staging 720, and staging to production 730. Documented backout plans and approvals may be used for migrations to support configuration management requirements.

The energy facility control systems described throughout this disclosure may include architecture components designed with scalability in mind to support growth and meet performance goals with an increased volume of activity and data. Driving factors and considerations used in assessing scalability requirements include:

- User Volume: Current/expected number of users and expected annual growth in users during five year time horizon. Other key inputs include usage profile information including types and categories of users, named versus concurrent versus active user ratios, user login frequency, features used by each user type, how frequently users use features and which product features are used and how often.
- Transaction Volume: Current/expected transaction volumes and potential growth during five year time horizon. Depending on the application, transaction type may also be a key input.
- Data Size and Volume: Current/expected size of data and potential growth during five year time horizon.
- Database and File Sizing: Current/expected size of database and files including potential growth during five year time horizon. Inputs for file sizing include type of data such as range of document or spreadsheet file sizes, size of CAD files or other engineering data, expected record volumes, etc.

The energy facility control systems described throughout this disclosure may account for growth considerations to balance the amount of scalability (and related cost) architected with new applications. In other words, growth assumptions have been reflected in the architecture designs, but have not necessarily been implemented or committed resources that are not yet needed. The architecture designs may scale up or out as needed to accommodate future growth without requiring investment for capacity that will not be utilized yet.

Scalability approaches and best practices implemented in the architecture components may include:

- Horizontal and Vertical Scalability: Build or select products that are designed so they can either be scaled up or scaled out.
- Proactive and Reactive Scaling Strategies: Plan for proactive scaling by anticipating increased demand and pre-allocating system capacity. Additionally, provide a mechanism for reactive scaling to ensure that extra resources are available to handle sudden, unanticipated demand. For proactive scalability planning, sound data center practices, metric gathering tools, and a predictable scaling model are needed. For reactive scalability, simple horizontal scaling capabilities and the ability to rapidly reallocate resources as business priorities change are both needed. Even when it is possible to plan for demand, it may not be possible or cost-effective to proactively purchase additional hardware resources to support new or existing applications.
- Proper Caching Techniques: Caching is an important tool to be used in improving the performance for frequently accessed information. This includes caching techniques such as WAN Optimization and application specific caching via client or server application components.
- Federated Architecture: Build or select products that are designed to federate architecture components by effectively breaking down into more manageable sized service collections.
- Multithreading: Build or select products that support multi-threading to process multiple requests simultaneously.
- Do Not Fight for Resources: Contention for resources is the root cause of scalability problems so headroom is included to avoid insufficient memory or processor cycles, constrained bandwidth, or inadequate database connections.
- Additionally, virtualization and cloud computing are used to provide additional infrastructure options to support scalability requirements frequently with schedule and cost benefits.

The energy facility control systems described throughout this disclosure may account for high availability requirements. When high availability requirements are present, the system includes an execution architecture that eliminates single points of failure in the production architecture. Generally, the system offers redundancy in the infrastructure (e.g., redundant network connections, clustered servers, etc.) and application and infrastructure configurations to support high availability (e.g., load balancing).

The energy facility control systems described throughout this disclosure may implement a disaster recovery plan. For instance, regular data backups may be implemented in the primary data center including an offsite tape cycle and production data may be replicated to the backup data center. The system may provide a consistent remote replica of business-critical data in the event of a disaster. It preserves write-order of changed data and stores it with time-specific and application-specific, if needed, bookmarks to enable immediate recovery to any point in time without data loss.

The energy facility control systems described throughout this disclosure may employ an enterprise architecture framework to support the design, planning, implementation, and governance of system components. These components include business process architecture, application architecture, data architecture, and technical architecture. The framework relies on a set of processes and tools to ensure information technology is applied consistently across the evolving needs. When new business needs are identified, IT planning and blueprinting results in projects buy, build or integrate enterprise architecture components to deliver the expected business results.

For governance, the system may leverage processes and management practices to support the application of IT architecture. Use of these processes and management practices may provide several benefits including:
  Improved responsiveness and implementation timeliness by defining and streamlining decision making
  Improved accuracy in meeting business needs/objectives
  Reduced infrastructure and application costs by maximizing commonality across solutions
  Reduced development costs through reuse of reference architecture components
  Increased IT operational effectiveness and risk mitigation through process standardization
  Increased architecture compliance, resource performance and the business value created thru a well-managed architecture The system may offer governance provided from within IT, from the business, from business partners, and from executives:
  Standing IT committees (e.g., Change Review Board)
  Business Process Task Force
  IT Advisory Steering Committee
  Technical Integration Committee In the energy facility control systems described throughout this disclosure, document management capabilities may be oriented around creating data, drawing and document linkages so that System, Structure and Component (SSC) level BoM's can be created including relevant supporting information. For example, the integrations for IMS applications facilitate transfer of data from the 2D/3D design models and also the component relationships and hierarchy. The creation of these relationships combined with change management workflows, major and minor versioning, and audit capabilities enable advanced configuration management capabilities. The integration and linkage of SSC relationships with data, documents and records may be leveraged in many of the functionalities throughout all phases of the plant lifecycle to support impact assessments, operability evaluations, MEL development, plant design changes, lessons learned, PI&R/CAP, etc.

The energy facility control systems described throughout this disclosure may provide a Documents and Records Management capability similar to that of an Enterprise Document Management system. It includes management of controlled documents and quality records incorporating all record types across plant lifecycle phases. Additionally, the quality records capability can be applied to "non-document" files including metadata and complex 3D model files. The capability also supports re-use and integration of any controlled document and/or record information with other system contents to eliminate redundancy and promote single-sourcing of information.

Document management performed by the energy facility control systems described throughout this disclosure may offer much more than an ECM tool. Specifically, document management applications split configuration management across applications complicating impact assessment for changes. Document management applications limit ability to implement content reuse for engineering content and data. Document management systems lack BOM (i.e., plant structure) and CAD integration/management functionality. The energy facility control systems described throughout this disclosure may centralize and connect all forms of plant information providing information accessibility, visibility, and control needed to manage and fully utilize your entire set of plant information. The energy facility control systems described throughout this disclosure may provide support to break the paper/PDF QA data approach.

In some implementations, the energy facility control systems described throughout this disclosure may provide Advanced Data Management. Advanced Data Management is the capability to manage data that is embedded within documents and records (including calculations and 2D/3D drawings). In addition, the energy facility control systems described throughout this disclosure may define MetaData and Relationship Model and may manage metadata requirements, definitions and relationships of SSC's and associated records, documents and data. In the case of project schedule, this also may include a 4D view (e.g., a 3D model plus a time dimension related to construction activities). The energy facility control systems described throughout this disclosure also may perform Impact Assessment, which is the capability to assess the impact of proposed changes to define physical, design or licensing conflicts. The energy facility control systems described throughout this disclosure further may perform Workflow Definition, which is the capability to create, maintain, manage and monitor workflows to support and accelerate business decisions. In addition, the energy facility control systems described throughout this disclosure may offer Audit Trail Definition, which is a capability to create a complete audit trail for changes to critical data/documents and tracking workflow actions and approvals. This supports any potential investigations or root cause analyses associated with the construction Problem Identification and Reporting process or the operational Corrective Action Program.

In some examples, the energy facility control systems described throughout this disclosure may provide Computer Aided Design (CAD) capabilities. For instance, the system may provide CAD Data Management that imports and manages the data, and data relationships, provided in CAD files (e.g., from Areva, Bechtel or other suppliers). This may include proprietary CAD data, such as Aveva PDMS, as well as supplier CAD data from other systems such as CATIA with common or open file standards. The system may be able to integrate CAD data into a common plant view including linking relevant 2D and 3D components (e.g., 2D P&ID view and related 3D system/component view) and related 3D components (e.g., detailed supplier 3D model of components linked to less detailed Aveva 3D model). Furthermore, the CAD data may be managed and compared across plant projects. Additionally, 2D and 3D CAD data may be (re)used during plant operations in supplier interactions for future procurement of components or services. This may enable shortened procurement cycles and more accurate supplier responses.

The energy facility control systems described throughout this disclosure may offer Visualization/Mark Up 2D/3D, which provides the capability to visualize, measure and mark-up 2D/3D models and associated documents and data files. The system may include more advanced capabilities, such as 3D comparison and clearance analysis. Visualization and mark-up of the 2D/3D files and data may enable engineering and operations/maintenance personnel to view these models and information for a variety of purposes during all lifecycle phases including:

Completing the initial owner's acceptance process for review and comment on design deliverables.

Performing impact assessments during licensing/design/construction phases to evaluate and judge acceptability of requested changes or to support resolution of discrepancies, open items and corrective actions.

Support ITAAC completion including extent of condition assessments for cases where problems have been identified and are in the evaluation or corrective action process.

Performing impact assessments during operations phase for evaluating plant performance issues, performing root cause analyses, planning plant modifications or improvements.

Enhancing work planning and worker productivity by using these capabilities to support operations, engineering and maintenance planning and training, improving the effectiveness of maintenance work planning and work package preparation, performing detailed job simulation, and pre-job briefings.

Evaluating worker safety and radiation protection by 3D detailed job simulation to evaluate human factors such as required reach, clearances, and radiation exposure.

In some implementations, the energy facility control systems described throughout this disclosure may provide Contractual Requirement Management (Scope Book) capabilities. In these implementations, the Scope Book constitutes the detailed owner's requirements for the project or some may call it the "technical specification" for the contract. It also includes requirements where the assignment to fulfill the requirement remains with the owner. This document may be very large and complex with over twenty major sections and many appendices, drawings and tables with several revisions that have taken place already and many more anticipated in the future. To facilitate improved management of the requirements, the scope book requirements are managed as structured content facilitating granular security/access control, ability to concurrently edit contents while maintaining configuration control, and an automated workflow request and change approval processes for requirements changes at a much more granular level. Each change to the Scope Book has a potential impact on the project cost, schedule, and plant operability, so configuration management and impact assessment are performed for each change. Each section of the Scope Book is placed under configuration control to ensure control of all requirements and to manage any changes through a formal change management process. In addition, this capability may be used to support management and traceability of the DDE deliverables (to ensure that scope book requirements have been met), and to correlate specific deliverables to the SSC hierarchy to ensure completion of design and license basis requirements and supporting future impact assessments. It may also extend beyond the DDE Scope Book requirements to the full EPC scope of requirements.

In some examples, the energy facility control systems described throughout this disclosure may perform Scope Book Requirements Management. Scope Book Requirements Management provides the capability to manage the Scope Book requirements electronically and linking them to associated SSC's, as applicable. In addition, the energy facility control systems described throughout this disclosure may perform Scope Book DDE Integration, Scope Book SSC Integration, and Scope Book Change Management. Scope Book DDE Integration enables the Scope Book requirements to be integrated with specific DDE deliverables from the consortium partners. Scope Book SSC Integration enables the Scope Book deliverables to be integrated with SSC data structures and hierarchies. Scope Book Change Management enables a controlled change management process to be applied to managing Scope Book changes and identifying the impact of those changes.

In some implementations, the energy facility control systems described throughout this disclosure may include requirement management capabilities. The capability and value extends throughout the full lifecycle of the plant. Loss of design and license basis is one of the major reasons for extended construction delays of nuclear power plants. The plant receives a combined COL based on regulatory approval of the plant design (NSSS and BOP) and other specific license requirements from NRC and other agencies including things such as security, emergency planning, technical specifications, plant discharge and environmental conditions, etc. These are the design and licensing requirements that must show compliance with during the full plant lifecycle.

For example, ITAAC is a specific regulatory verification process that is being implemented to verify that the plant was, in fact, constructed as required by the COL. The specific areas of verification are defined in the COL application and for those items will verify that the design and licensing requirements have been met specific acceptance criteria through specific inspections, tests, or analyses. ITAAC is one of several verification methods used by the NRC to verify adequacy of the EPC process. Others methods include the QA process, Construction Inspection Program, Oversight of Vendor Activities, etc. ITAAC is significant because it is a new regulatory oversight process and will also be presented to the NRC commissioners for approval prior the fuel load.

In some examples, this capability ensures that changes to design and license basis requirements driven by regulatory authorities or design/construction partners are tracked through change control methods and reconciled against existing requirements. In addition this capability is used as a foundation element for plant operational, maintenance and design change programs to ensure that all plant activities conform to the design and license basis.

The energy facility control systems described throughout this disclosure may provide Advanced Design Basis Management, Advanced Licensing Basis Management, and ITAAC Enablement. Advanced Design Basis Management provides the capability to manage design basis requirements and link those requirements to associated SSC's, calculations, etc. for individual plants and across the fleet. Advanced Licensing Basis Management provides the capability to manage licensing basis requirements and link those requirements to supporting licensing bases verification packages and to associated SSC's, procedures, etc. for individual plants and across the fleet. This capability supports both NRC licensing as well as the many other agencies that govern plant licensing. ITAAC Enablement provides the capability to integrate the Inspection, Test, Analyses and Acceptance Criteria process with SSC documents, records and hierarchy and managing the process workflow. ITAAC Enablement refers to reviewing NRC requirements, understanding protocols such as binning, identifying roles and responsibilities, and identifying data required to successfully manage ITAACs. These findings are reflected in the system data model and passed through to the NSSS and EPC as scope book requirements.

In some examples, the energy facility control systems described throughout this disclosure may provide Regulatory Issues Management capabilities. In these examples, the system may provide Regulatory Commitment Tracking, COLA Enablement, NRC Security and Access, and/or RAI (Request for Additional Information). Regulatory Commitment Tracking capability enables managing regulatory commitments (NRC or other regulatory agencies) and linking requirements to associated SSC's or other programs for individual plants and across the fleet. COLA Enablement provides the capability to manage a Reference COLA (rCOLA) and Subsequent COLAs (sCOLAs) in a manner that optimizes reuse of generic text, tables and graphics, improves configuration management, and provides an automated workflow process supporting licensing basis change requests resulting from Requests for Additional Information (RAIs) and requested engineering/design changes. NRC Security and Access capability enables the NRC security controlled access to facilitate audits and accelerate regulatory reviews. RAI enables full management of the Request for Additional Information (RAI) process and workflow including correspondence tracking, licensing research, response team collaboration, and mandatory time commitments for response.

Figure 8:
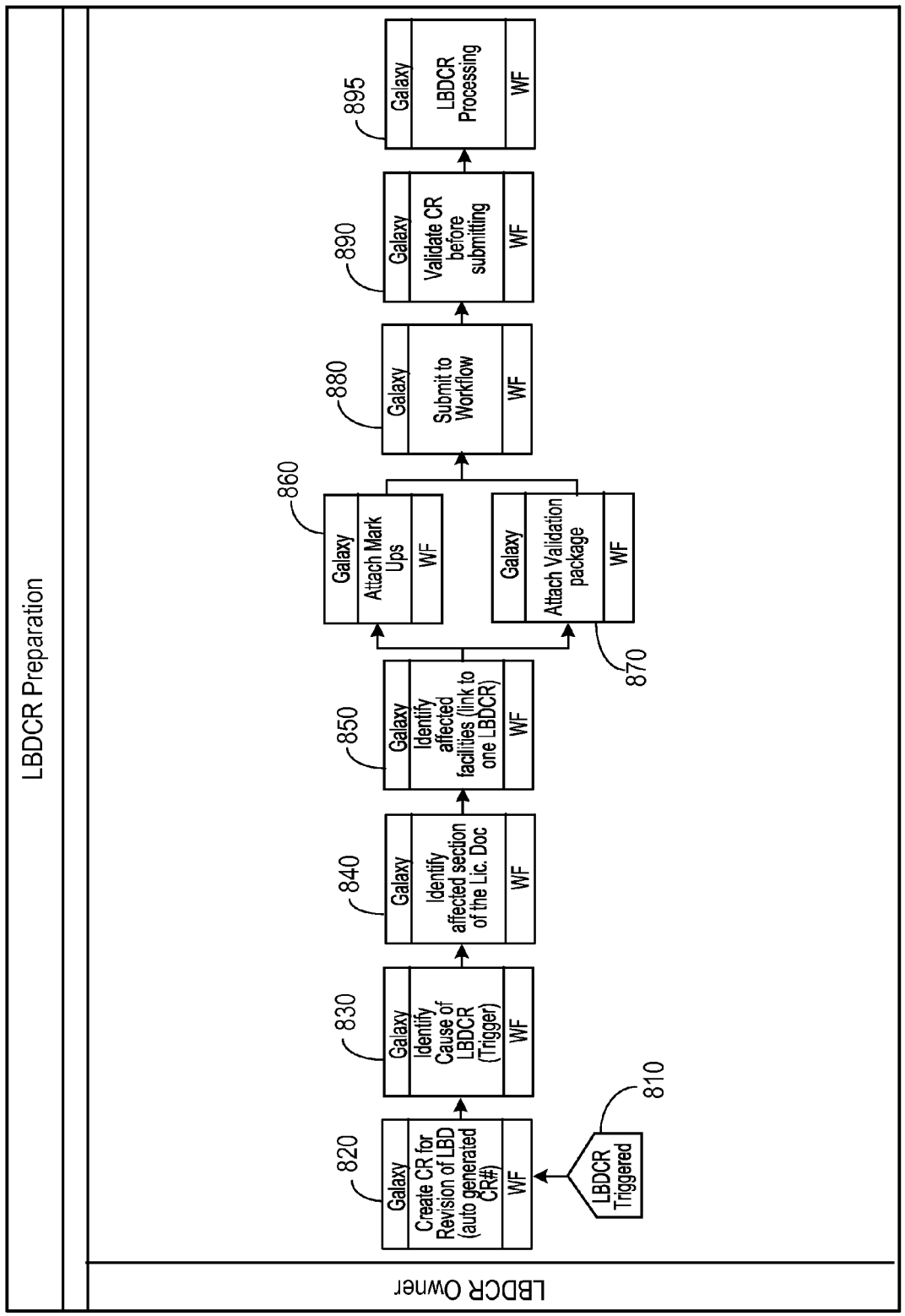
Figure 9:
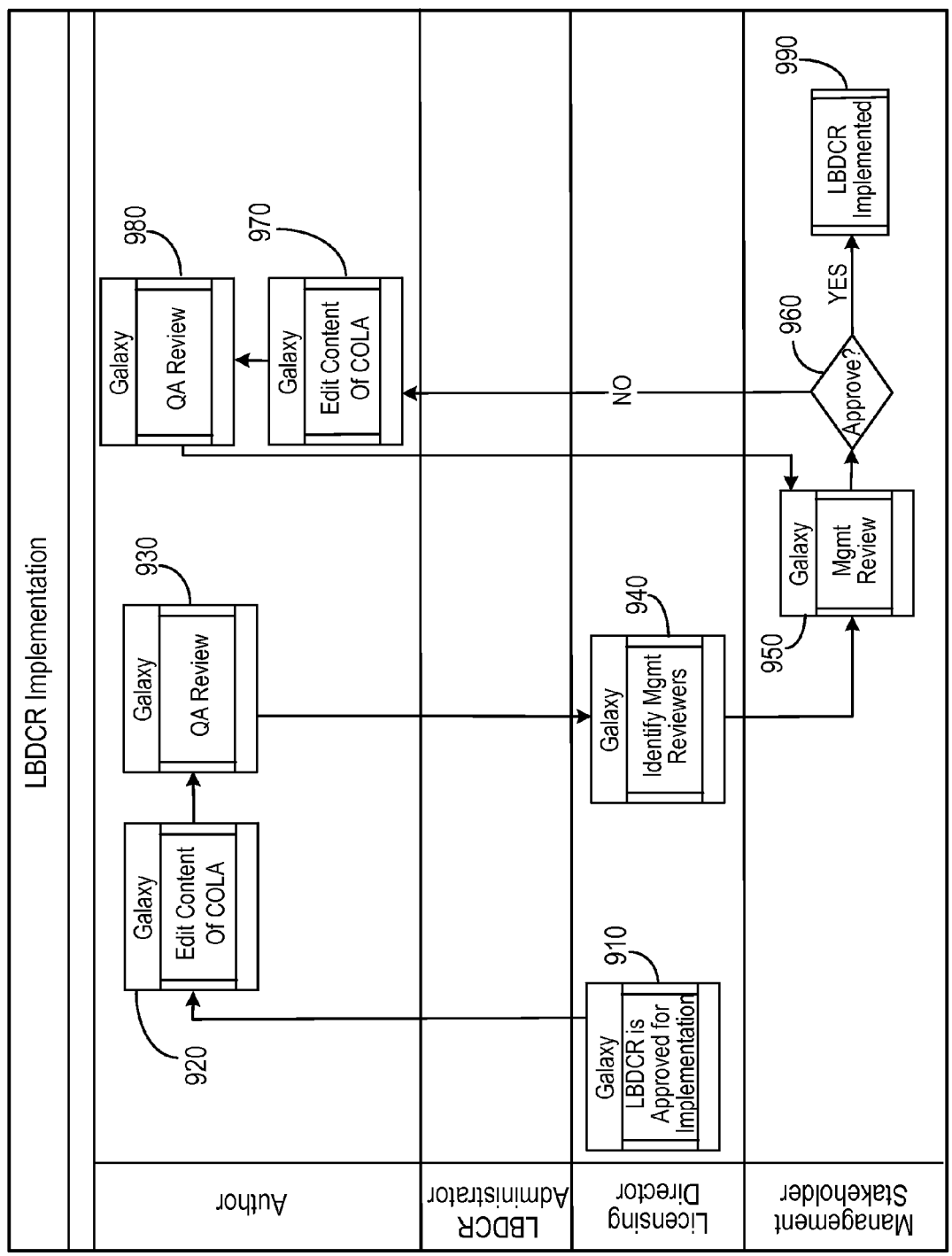
Figure 10:
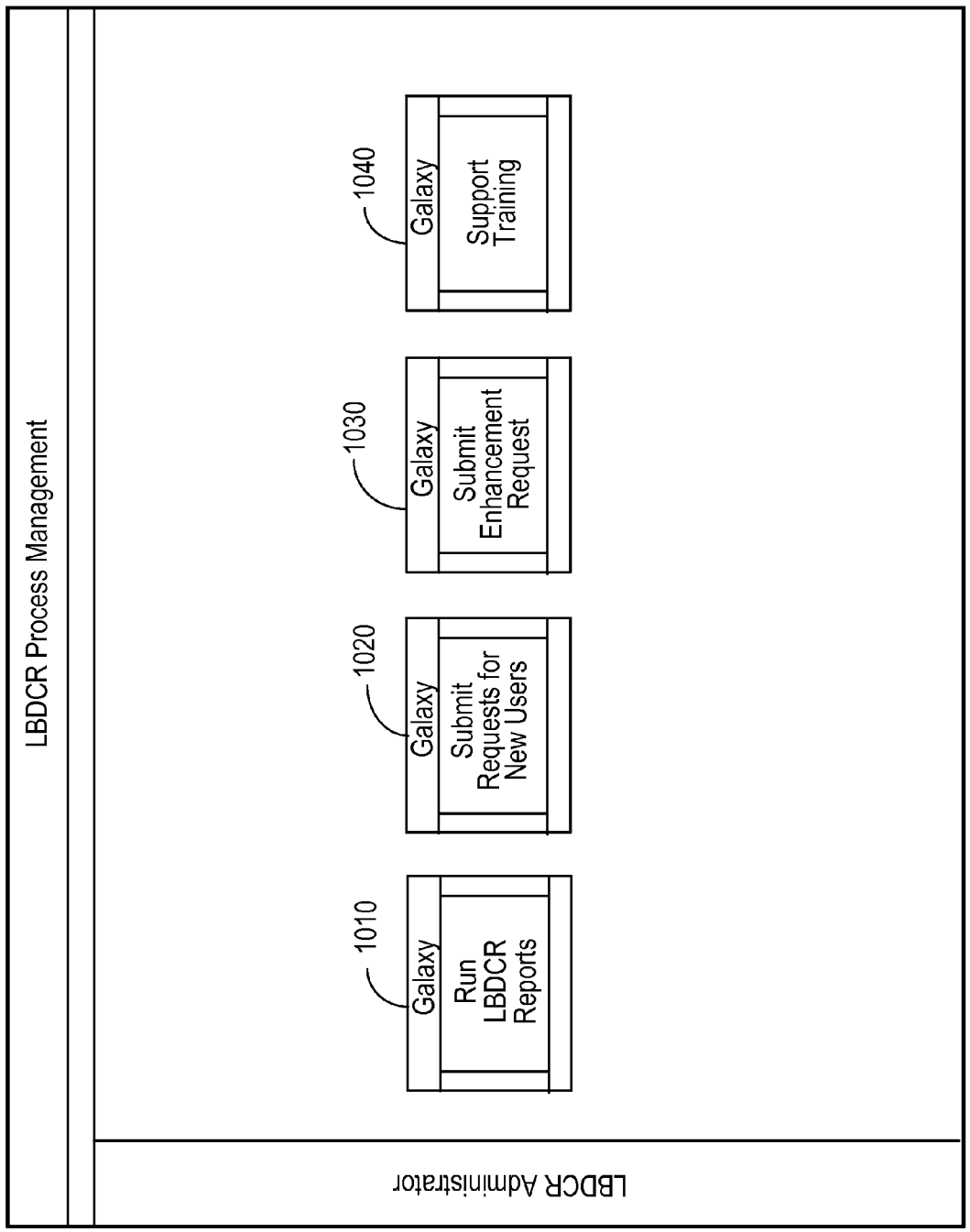

FIGS. 8-10 illustrate example License Basis Design Change Request (LBDCR) process flows. As shown in FIG. 8, an LBDCR is triggered (810) and the system creates a change request for revision of the license basis design (820). The system identifies a cause of the LBDCR (830) and identifies an affected section of the license document (e.g., identifies affected data objects that are included in the license document) (840). The system identifies affected facilities (850), attaches mark ups (860), and attaches a validation package (870). The system submits the change request to the workflow (880) and validates the change request before submitting (890). The system then performs LBDCR processing on the change request (895).

As shown in FIG. 9, the system receives approval of an LBDCR from a licensing director (910). Based on the approval, the system edits content of the COLA based on input provided by an author (920) and performs QA review (930). The system then identifies management reviewers based on input provided by the licensing director (940) and submits the edited content to the identified management reviewers for approval (950). The system determines whether the identified management reviewers have approved the edited content (960). In response to a determination that the edited content has not been approved, the system perform additional editing of the content of the COLA based on input provided by the author (970), performs QA review based on the additional editing (980), and resubmits the edited content to the identified management reviewers for approval. The process is repeated until the edited content is approved. In response to a determination that the edited content has been approved, the system implements the LBDCR (990).

As shown in FIG. 10, the system runs LBDCR reports (1010) and submits requests for new users (1020). In addition, the system submits enhancement requests (1030) and provides support training (1040).

Figure 11:
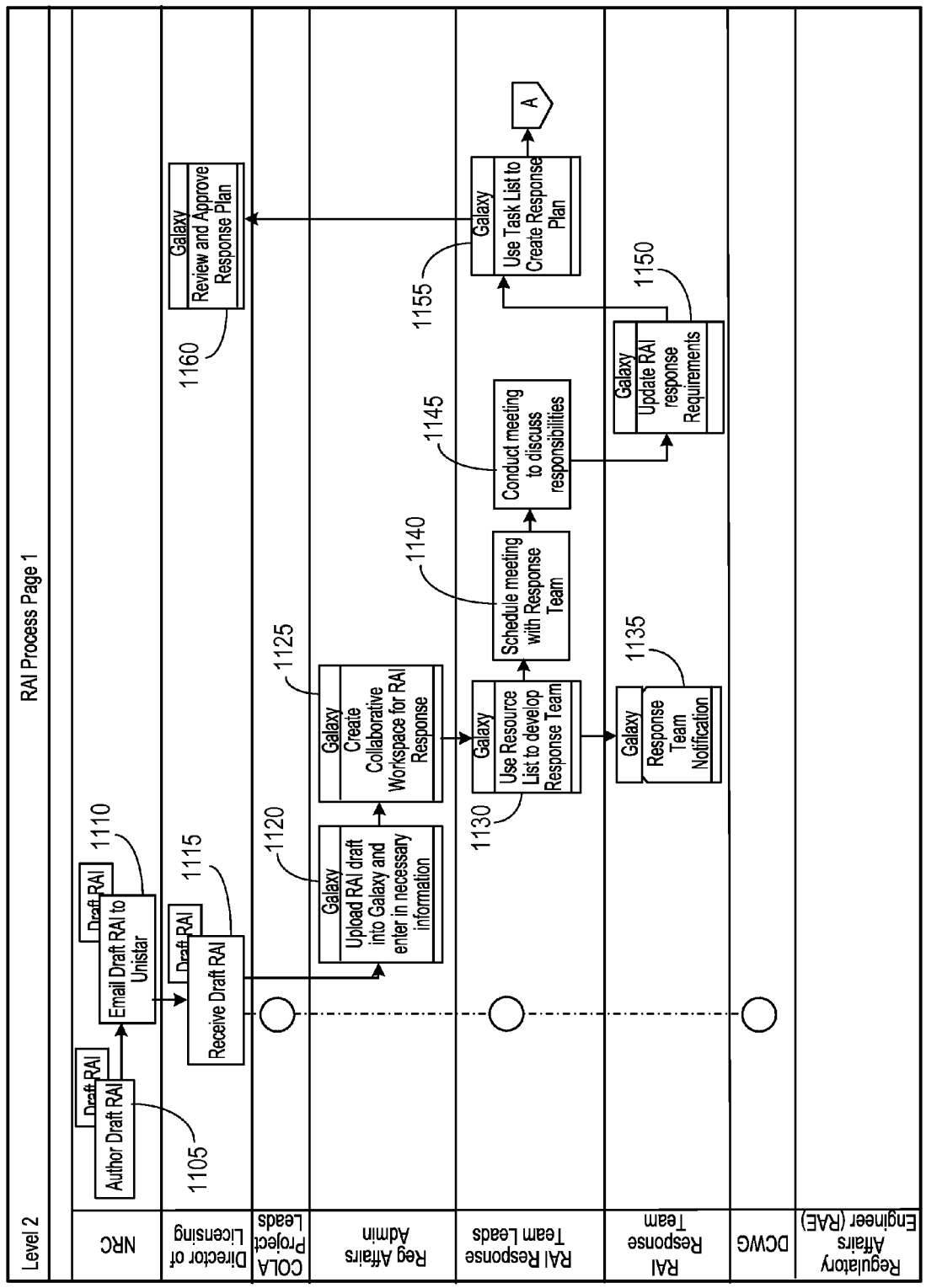
Figure 12:
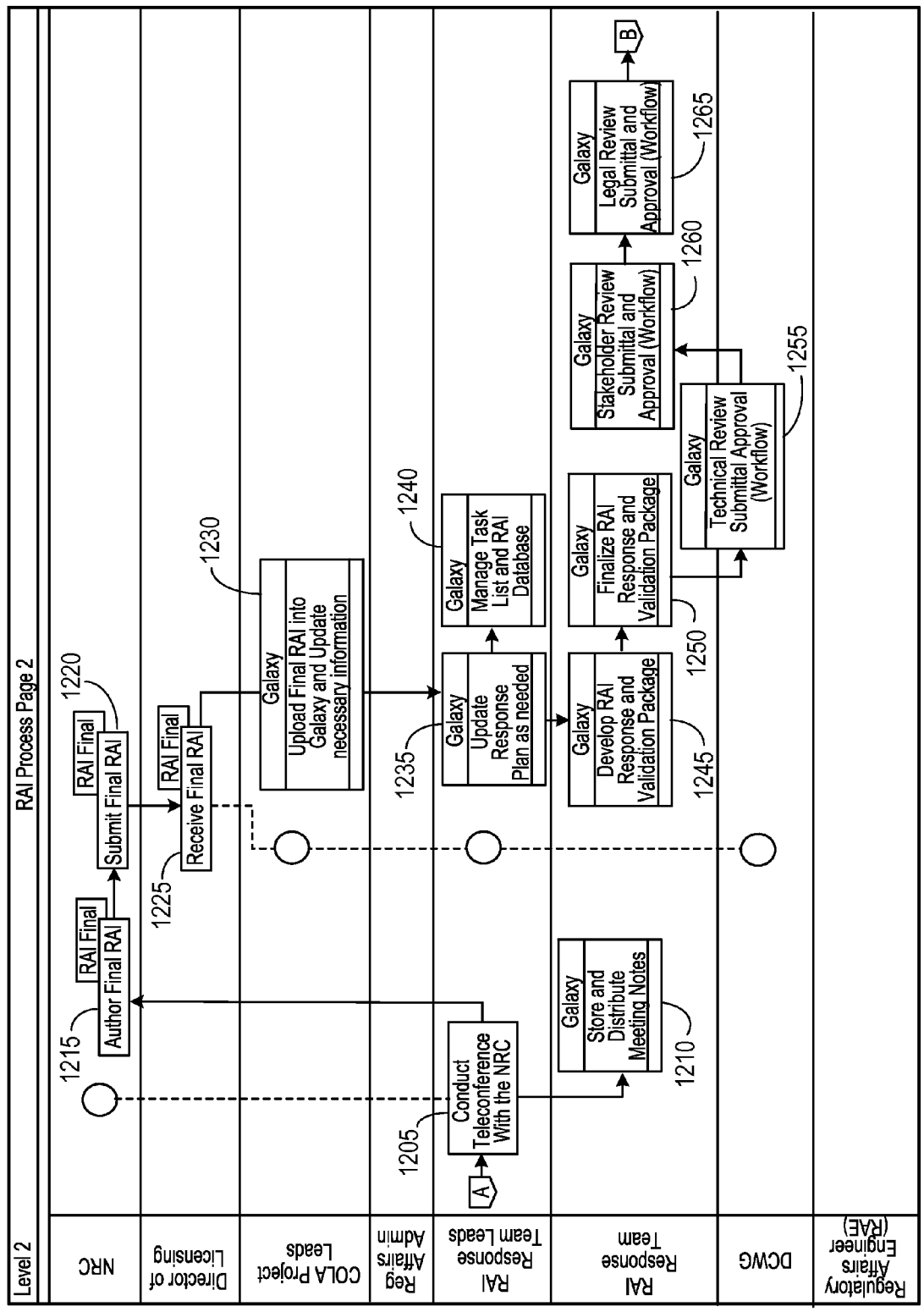
Figure 13:
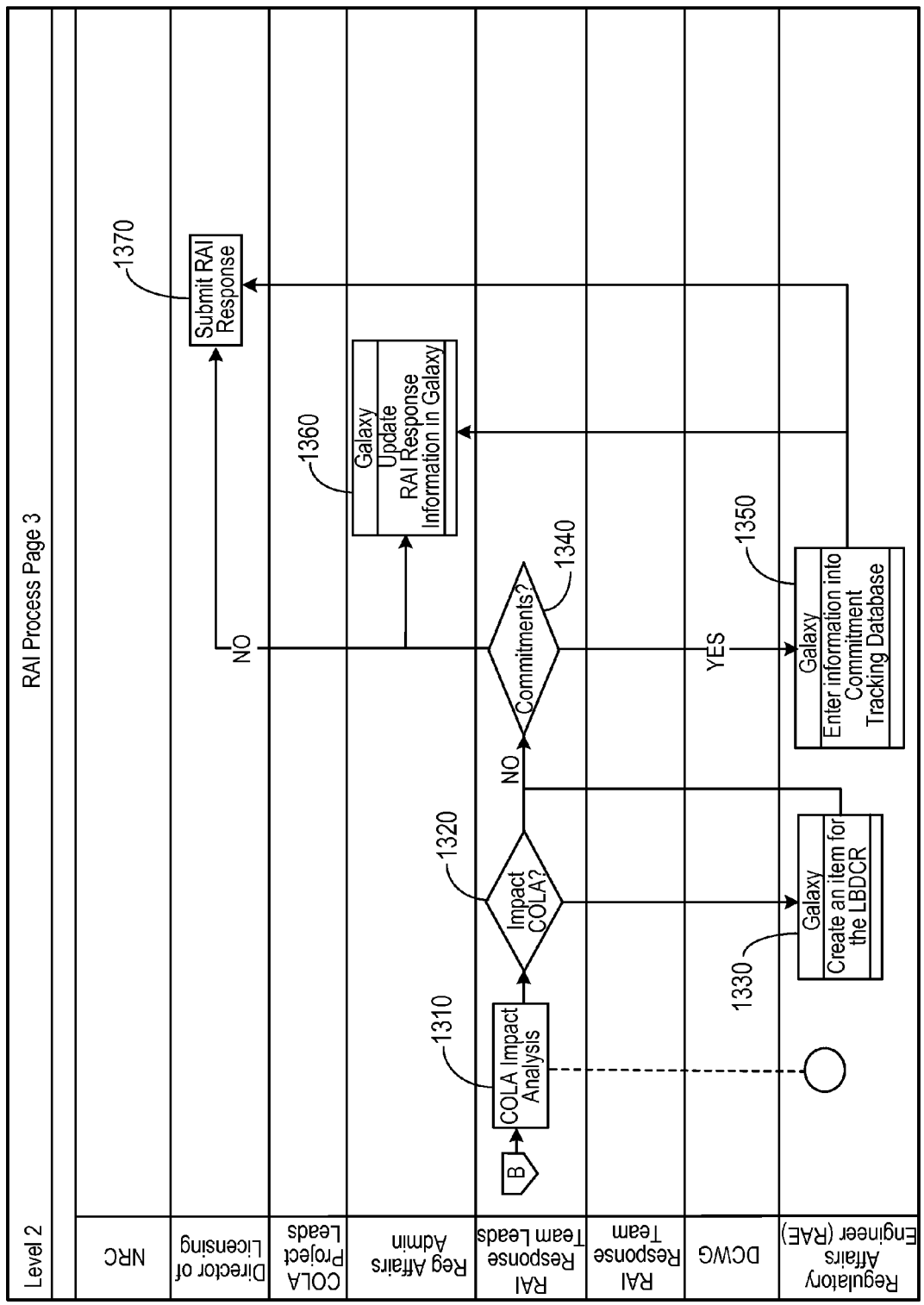

FIGS. 11-13 illustrate example RAI process flows. As shown in FIG. 11, an NRC employee drafts a RAI (1105) and sends the draft RAI to a director of licensing at the energy facility (1110). The director of licensing at the energy facility receives the draft RAI (1115) and the system receives an uploaded version of the draft RAI and other necessary information (1120). The system then creates a collaborative workspace for RAI response (1125) and uses a resource list to develop a response team (1130). The system notifies members of the response team (1135) and facilitates scheduling a meeting of the response team (1140). The response team conducts the meeting to discuss responsibilities (1145) and the system updates RAI response requirements based on input provided as a result of the meeting (1150). The system uses a task list to create a response plan (1155) and submits the response plan to the director of licensing for review and approval (1160).

As shown in FIG. 12, the RAI response team conducts a telephone conference the NRC employee (1205) and the system stores and distributes notes from the meeting (1210). The NRC employee authors a final RAI (1215) and sends the final RAI to the director of licensing at the energy facility (1220). The director of licensing at the energy facility receives the final RAI (1225) and the system receives an uploaded version of the final RAI and other necessary information (1230). The system then updates the response plan based on the final RAI (1235) and manages the task list and RAI database (1240). The system develops an RAI response and validation package based on input from the response team (1245) and finalizes the RAI response and validation package (1250). The system submits the RAI response and validation package for technical review and approval (1255) and, after technical approval, the system submits the RAI response and validation package for stakeholder review and approval (1260). After stakeholder approval, the system submits the RAI response and validation package for legal review and approval (1265).

As shown in FIG. 13, after legal approval, the RAI response team performs COLA impact analysis (1310) and the system determines whether the RAI response impacts the COLA based on input from the RAI response team (1320). If the COLA is impacted, the system creates a team for the LBDCR (1330). If the COLA is not impacted or after the team for the LBDCR is created, the system determines whether any commitments exist based on input (1340). If commitments exist, the system enters the commitment information into a commitment tracking database to enable commitment tracking (1350). If no commitments exist or after entering the commitment information into the commitment tracking database, the system updates the RAI response information in the system (1360) and sends the RAI response to the director of licensing for submission (1370).

In some examples, the energy facility control systems described throughout this disclosure may provide quality capabilities, such as QA Program and Audits. QA Program and Audits provide the capability to implement the QA Program and ensure that audit findings are comprehensively linked to applicable SSC or other areas to support audit closeout. A variety of processes may be implemented, including associated documents and records including items such as:

Manage Quality and Process Improvement
Define Quality Standards, Policies, and Procedures
Manage Quality Training
Manage Reliability Assurance
Manage Inspections
Manage Non-Destructive Examinations
Manage Procurement Quality
Manage Audits
Manage Lessons Learned and Operator Experiences
Manage Corrective Actions Program In some implementations, the energy facility control systems described throughout this disclosure may provide extended enterprise capabilities. Collaboration is intended both within the organization, with Project Partners, across the ecosystem of partners to the maximum extent possible, and with the NRC or other regulators. The extent of collaboration between partners may vary from simple document or file exchange to live, interactive collaboration sessions to review documents, designs including 2D/3D. For example, interfaces may be built between partners to obtain data and 2D/3D information directly into the system. Preliminary reviews of design deliverables may be provided prior to formal owner acceptance to avoid rework (e.g., revisions requiring additional formal quality assurance review). Collaboration with project partners may include creation of an extended network, so that these partners can also view, evaluate and comment on applicable design, licensing and construction activities. For the NRC, a virtual reading room or "clean room" enables sharing of documents and drawings with the NRC in read-only manner mimicking physical reading rooms. This may shorten review cycle times with regulators by eliminating travel requirements and reducing potential NRC Requests for Information (RAIs) that would require formal regulatory filings in response to RAIs. This capability may be used in ITAAC reviews to enhance interactions with NRC auditors.

In some examples, the energy facility control systems described throughout this disclosure may provide Internal Collaboration Design Collaboration Contract Management Knowledge Management, and Cross-Company DDE Integration. Internal Collaboration provides the capability for internal collaboration for workflow, document review and business efficiency. Work processes may be implemented in the system. Design Collaboration provides the capability for design collaboration among the partners with enabling workflow and SSC linkage to applicable data, drawings and documents. Contract Management provides the ability to manage supplier contracts and the associated process workflows. This capability may ensure that appropriate sourcing methods and controls are deployed to achieve strong supplier performance against contract commitments. Depending on the supplier, this may involve bringing that supplier onto the system platform for involvement in a collaboration environment (e.g., major suppliers). Knowledge Management provides the knowledge management capability, tools and workflow to ensure advantage for future work activities. This work may include integration of appropriate lessons learned from other global EPR projects, other new build projects in the US, licensing lessons learned, etc. Cross-Company DDE Integration provides the capability to integrate Consortium and Project partners in the DDE process in a common workflow and acceptance process with the near term objective of completing DDE.

The energy facility control systems described throughout this disclosure may provide Site Prep Management capabilities. For instance, Site Prep Management may provide the capability to support initial work associated with pre-construction activities including managing documents, records, contracts, permits and requirements of site preparation activities. This capability also supports compliance with the regulatory requirements of the NRC Limited Work Authorization (LWA) in accordance with 10 CFR 52.91 and 50.10.

The energy facility control systems described throughout this disclosure may provide Corrective Action Program capabilities. The capability provides enhanced workflow and integration of the PI&R process with the system data model so that there is complete linkage of impacts and status of PI&R actions on each plant SSC and Program. In addition, PI&R investigations for extent of condition review and determination of corrective actions are able to leverage the system data model to ensure that evaluations are comprehensive and complete. This may be useful for ITAAC completion during plant construction.

Following completion of plant construction, this same capability may be used to support the operational CAP. Some process changes may occur at that time to implement operability reviews, assess plant technical specification action statements, and ensure proper regulatory reporting. PI&R and CAP may provide the capability to manage the PI&R and CAP process and workflow to ensure program integrity and action closure. PI&R/CAP Action Items may provide the capability to manage action items and track applicability to SSC's or other areas and providing a comprehensive closure data package. PI&R/CAP Self-Assessment may provide the capability to manage the Self-Assessment Program and integrating action items into the PI&R/CAP Programs. PI&R/CAP Lessons Learned may provide the capability to manage the Lessons Learned and Operating Experience Programs and integrate action items into the PI&R/CAP Programs.

In some implementations, the energy facility control systems described throughout this disclosure may provide Asset Structure Management capability. This capability enables looking at the information from multiple perspectives which may be highly valuable for ensuring complete configuration management of the plant and compliance with design and license basis requirements, evaluating issues identified in the Problem Identification and Reporting process and completing comprehensive corrective actions (including ITAAC extent of condition reviews), and thorough identification of all analyses, drawings and documents impacted by a design change to the plant. Asset Structure Management may provide the capability to create and maintain asset structure relationships to which data, 2D/3D CAD, analysis files, documents and records are linked to plant structures. The PLM tool may enable the technology, but may be combined with configuration that supports end user business processes and requirements to support a variety of needs. This may support single point access to all documents, records and data from a variety of perspectives, e.g., plant SSC (equipment ID basis organized by either structure or system), component information (manufacturer/model number), document information (identification of applicability to SSC or manufacturer/model number), etc.

In some examples, the energy facility control systems described throughout this disclosure may provide Program Management Office (PMO) capabilities. This capability may be built in the L&D phase because it is needed at that time; however, it is used throughout the plant lifecycle. The approach, workflow and tools may potentially change when the plant becomes operational and major construction work has been completed. Program Management Office (PMO) provides the capability to leverage tools, processes and workflow to support project development, design and completion. The PMO is associated with the entire project and takes input from the various project participants to ensure proper oversight, approvals and management of all project completion activities. It integrates with Consortium partner tools to receive project cost and schedule information electronically, as well as other elements such as Risk Management, Communications, etc. This capability does not replace the tools used by the Consortium partners to manage their internal workforce and activities. Project Scheduling provides the capability to support overall project scheduling and, as appropriate, workforce scheduling and assignment to work assignments. Integrated workflow ensures that records, documents and approvals are followed in accordance with project governance and procedures. This is one of the capabilities of the PMO. Cost Management provides the capability to support cost allocation to project participants, as well as normal cost control methods and reporting including earned value reporting. Integrated workflow ensures that records, documents and approvals are followed in accordance with project governance and procedures. This is one of the capabilities of the PMO.

The energy facility control systems described throughout this disclosure may provide Procedure Management capabilities. This capability is associated with the transition from design and licensing to operations. Plant operations, maintenance, engineering and other support organization procedures are developed prior to initiation of plant operations. These procedures have basis documents with inputs, constraint and references to data values, plant configurations, and assumptions that constitute the design and licensing basis of the plant. Any changes to plant configuration may be synchronized with the change control process for procedures. The system is used to create linkages between the procedures and these key input requirements as configuration is managed to ensure that the operations and maintenance procedures are aligned with the physical plant configuration. Procedure Change Control may implement capability to manage and automate the procedure life cycle consistent with design and licensing requirements.

In some examples, the energy facility control systems described throughout this disclosure may provide Human Resources Management capabilities. These capabilities refer to typical Human Resource Management systems that are used to support management in ensuring that the organization is appropriately staffed and has necessary personnel development, career planning, and succession planning functions. The system may provide Resource Management, Recruitment and Selection, Organizational Development, and/or Talent Management. Resource Management capability enables the organization to manage resource workloads considering workload demand forecasts and budget limits and other constraints. Recruitment and Selection capability supports the staff recruiting and hiring and the work processes and workflow to personnel on-boarding to meet business needs. Organizational Development capability enables organizational development tools, training and workflow to support personnel retention, promotion and career advancement to support business needs. Talent Management capability implements talent management tools and associated workflow to implement organizational and individual diagnostic and assessment activities to define gaps and succession paths in support of business needs.

In some implementations, the energy facility control systems described throughout this disclosure may provide Quality Management capability. This capability also supports several key regulatory processes and helps to mitigate potential schedule delays caused by inadequate evaluation and extent of condition review associated with QC findings during the plant construction process. Programmatic aspects of the assessment (e.g., root cause analyses, trending, etc.) are integrated in with the Problem Identification and Resolution (PI&R) process. After initiation of commercial operation this capability may be closely integrated with the operational Corrective Action Process (CAP). QC Findings/Closeout capability supports the Quality Control (QC) Program and ensures that audit findings are comprehensively linked to applicable SSC or other areas to support closeout.

The energy facility control systems described throughout this disclosure may provide Configuration Management capabilities. For instance, the system may include Master Equipment List (MEL) Development, Procurement Engineering, and/or Vintage Management. MEL Development capability refers to the creation of the Master Equipment List (MEL) incrementally as SSC data and hierarchies are built during the design, licensing and construction phases. The accuracy of the MEL is maintained as configuration and operational changes occur during plant operations through procedural controls and workflow supported by the system.

The MEL is a listing of all the SSC within each plant and is a tool to support engineering, operations and maintenance as it includes the critical information about plant equipment that supports these business functions. Typical information provided on the MEL includes equipment tag number, description of equipment, equipment type, manufacture, model/part number, serial number, quality level, NPRDS, Equipment Qualification, vendor drawing reference, P&ID reference, Design Specification reference, Equipment Data Sheet reference, installation date, warrantee date, original PO, etc. As an example, the MEL for existing plants may have roughly 600,000 functional locations, with 50-80 attributes for each location with key data. In today's operating plants, the MEL has been developed from many (sometimes hundreds) of individual lists (e.g., load list, line list, MOV list, EEQ list, Appendix R penetration list, etc.)

The development of the MEL in the system is organized in an integrated data model from the start to avoid a large backfit effort, reduce integration requirements, and promote information re-use. In addition, it is possible to view, compare and report on the MEL from several perspectives; Functional Location Hierarchy (Facility, Unit, System, and Component), Component Type (e.g., all pumps at CC3, or across the entire fleet), Manufacturer/Model, and various Ad-Hoc query methods based on attribute values.

Procurement Engineering capability supports managing procurement engineering requirements and records associated with SSC fit, form and functional requirements. This supports procurement activities through completion of plant construction and during plant operations. This includes safety-related, non-safety related and commercial grade procurement and dedication.

Vintage Management capability enables management of vintage requirements and configuration across the fleet. The concept of vintage management is intertwined with fleet management as follows:

The system is used to manage the configuration and design and licensing basis of the individual plants and also across the fleet. To the maximum extent possible the plants are designed, licensed, constructed and operated in an identical manner (except for site-specific conditions). This is the concept of fleet management.

Over time variations in plant design and equipment will occur and this is when the concept of vintage management is applied. The concept of plant vintage to describe the potential for creating multiple fleets within the business model.

The system may be designed to manage the data and information for the entire fleet and also the subgroups within the fleet. Process models and workflows are fleet based but certain equipment practices or reliability models are group based. This capability may be highly valuable to manage design information and leverage that information across different plant design models, while maintaining complete configuration control within each group.

The energy facility control systems described throughout this disclosure may provide Commissioning capabilities. For example, the system may provide Fleet ITAAC. Fleet ITAAC refers to the activation of ITAAC capabilities within the system. This includes plant specific ITAAC, impact assessment across plants and the fleet and configuration management capabilities to identify and track changes. Specific Fleet ITAAC enablers within the system include interfaces with the NSSS and EPC, configuration of workflowsRef: 02267-90PR/US, confirmation of ITAAC numbering, final design of data storage approach and implementation of controls and reports. ITAAC may cross the DCD and the COLAs, and that multiple fleet plants may be in various stages of construction. Thus, the system mitigates potential for significant coordination issues. The system may establish US-wide and global coordination of RAI, EDV and ITAAC through use of the system.

In some implementations, the energy facility control systems described throughout this disclosure may provide Miscellaneous Communication capabilities. Wireless/RFID capabilities are beginning to gain wider acceptance in operating plants and have a number of functional applications such as:

Tagging, tracking and monitoring for:
  Warehouse and inventory management
  Plant equipment
  Tool management
  EH&S/Dosimetry
Mobile work management support including procedure/work task support and improving the efficiency of worker sign onto the workorder and tracking labor and materials used in completion of the job.
Mobile operator rounds
Equipment Walkdown
Remote kiosks
Data acquisition/monitoring
Wireless camera monitoring
Mobile business users A number of technology options and standards exist and are supported for the functional use cases described above. For example, both barcoding and RFID may be used to in tool management. Also, a number of wireless networking/communications standards exist (e.g., 802.11g, 802.15.4/Zigbee, etc.). Each use case requires more detailed functional and technical requirements analysis to determine the appropriate alternatives for each which is developed into consolidated and rationalized wireless/mobile architecture. Plant Wireless/RFID Design may provide the capability to implement infrastructure tools to enable use of wireless and RFID technologies in the power plant. Site Wireless Infrastructure may provide the implementing infrastructure tools to enable use of wireless and RFID technologies in other locations on the plant site.

As discussed above, the energy facility control systems described throughout this disclosure may provide Program Management Office (PMO) capabilities. The infrastructure and tools to support a Project Management Office (PMO) capability are established during the Licensing and Design Stage to be ready to handle the management needs of the projects during the Construction Stage. Some of these needs include the fully resource loaded schedule, the ability to produce Earned Value metrics on task level data and the ability to perform risk-based scenario analysis on the schedule. The system integrates a number of activities so the PMO has the ability to accurately capture contractual commitments as they occur and ensure contract payments are in line with contractual terms and conditions. To support this objective, a series of claims management processes with vendors are utilized to ensure the timely completion of project tasks. A key deliverable in these processes is the impact assessment, which captures the condition of the equipment installed and work completed at the point of closing the task in the schedule. This impact assessment is agreed to by the vendor conducting the work. Its role in the claims process is to serve as the baseline for all incoming claims, if a vendor claim is inconsistent with the information captured in the impact assessment it will not be reimbursed. Analyses are performed to validate compliance with the claims management process and to ensure that changes are not made outside of the normal process. PMO Interactive Command may create the capability to provide the Project Management Office (PMO) with the necessary reports, displays and forecast tools to enable command and control of the project.

In some examples, the energy facility control systems described throughout this disclosure may provide Procurement capabilities, such as Materials and Services Demand Management, Fleet Materials Management, Materials and Services Procurement, Receipt, Storage and Delivery, Supplier Relationship Management, Fleet Strategic Sourcing, and/or Supplier QA. Materials and Services Demand Management capability supports the planning and forecasting for future material and services needs based on history and forecasted activities. Fleet Materials Management capability provides for the management of materials used in the operations and maintenance activities of the plant. Materials and Services Procurement provides the capability to procure and manage the sourcing process for materials and services. Receipt, Storage and Delivery provides the capability to complete and document receipt inspection activities for Safety-Related and Non-Safety related materials in a manner that meets the requirements of the Quality Program and appropriate financial and procurement controls. Supplier Relationship Management provides the capability to manage relationships, sourcing methods and contracts with key suppliers. Fleet Strategic Sourcing capability enables management of the supplier strategic sourcing program across the fleet to take advantage of multiple plant sourcing opportunities while following appropriate project accounting methods. Supplier QA capability enables demonstration and documentation of suppliers' conformance with regulatory and contractual standards and is, in fact, approved to provide materials and services.

The energy facility control systems described throughout this disclosure may provide Advanced Simulator Configuration Management capabilities. Advanced Simulator Configuration Management provides the capability to maintain the configuration of the simulator consistent with the plant configuration. The simulator must be kept aligned with the plant as-built and all operating procedures to ensure that personnel training on the simulator will be exposed to the appropriate plant configuration. The system reduces the level of manual handoffs and tracking, level of manpower requirements and possibly level of cost in Simulator support. The Simulator relies on the plant model data as stored in the system. As such, workflows are created such that any configuration changes are directly queued to the Simulator group. There can also be a "Simulator" version of the plant model in the system, such that version control can be executed at any time and differences between the configuration of the plant and the simulator can be readily identified. Similarly, as the system stores procedures, automatic workflows and notifications are provided to the Simulator group to ensure simulation schemas are appropriately updated. As simulator versions are established for each plant within the system, the system may ripple plant configurations world-wide through to the impacted Simulator groups.

In some implementations, the energy facility control systems described throughout this disclosure may provide Training Plant Personnel capabilities. All training materials used may follow the USA standards, be based on the systematic approach to training, and be accredited by INPO. A Training Curriculum may provide the capability to manage the Training Program personnel requirements matrix and associated documents and records. This ensures that clarity about what training is required for each role exists to ensure compliance with regulatory requirements and conformance with standards. This is the matrix of what training is required for each role in the organization and to ensure alignment across the fleet. Training Curriculum Definition may provide the capability to manage the curriculum requirements and guidelines to ensure that the training program meets the requirements from NRC, INPO and other agencies. This is the matrix of the basis requirements for each training requirement. Training Design and Development may provide the capability to design and develop the training course content material and to maintain the library of content that is used in building the training courses. Training Content Management may provide the capability to link training content with the physical configuration of the plant, design and licensing requirements and operational procedures. This provides the linkage and configuration management of training materials to the plant. Training Facility Management may provide the capability to manage the physical training facility including classroom technology, building upgrades, etc. Learning Management Scheduling training may provide the capability to manage and coordinate training schedules, classroom assignments, instructor assignments, delivery methods and technologies, etc. Personnel Qualifications Management may provide the capability to manage the personnel qualifications and associated training records of personnel doing work at facilities. Consistent with regulatory policy this also may include leverage of training personnel may have received at other nuclear facilities.

In some implementations, the energy facility control systems described throughout this disclosure may provide Physical Security capabilities. The system may be used to establish and maintain all security-related data, systems and equipment, as security-related issues can impact personnel qualifications, fitness for duty or other work clearances. There is linkage to work management to accomplish these activities, but is done so in a manner that meets applicable requirements for handling of safeguards information. The system incorporates linkages with personnel badging and access, along with physical personnel tracking of personnel using RFID and sensors which can help manage key work activities. For example, personnel assigned to certain types of work (e.g., fire watch) should not leave their assigned plant areas. Physical Security may provide the capability to manage plant security systems and equipment related to physical site access and security. This may include security related to guardhouse, gate access, personnel identification and validation, and specific access requirements such as Fit-for-Duty.

Figure 14:
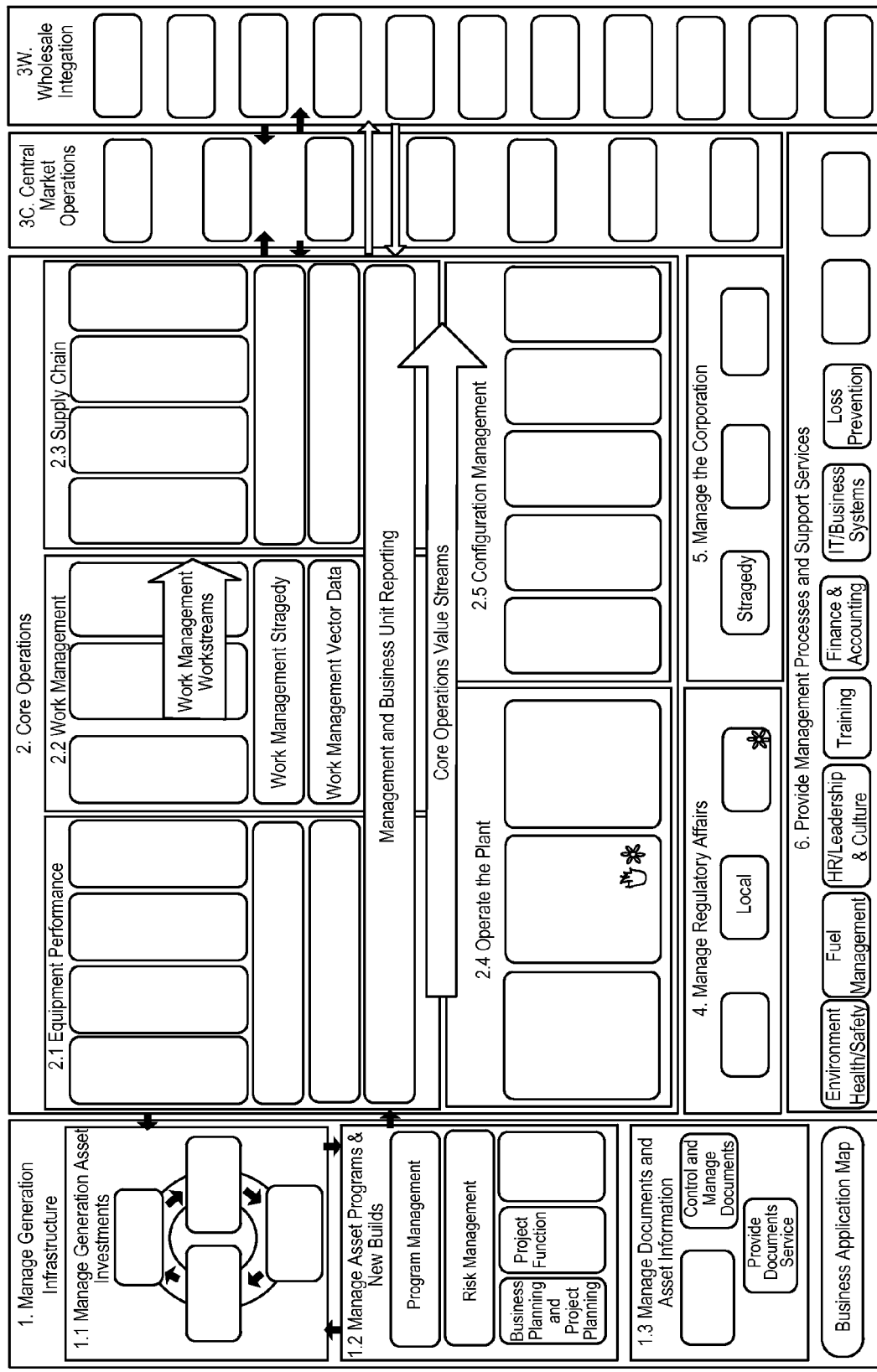
FIG. 14 is an example model for process definitions.

The energy facility control systems described throughout this disclosure may provide Operations and Maintenance (O&M) Queries. The O&M capabilities may be implemented as work processes, tools and procedures to fully implement the NEI Standard Nuclear Performance Model processes, including the associated AP Standards. FIG. 14 illustrates an example model for O&M process definitions that includes process flows from level zero thru four to six depending on the process area.

In some examples, the energy facility control systems described throughout this disclosure may provide O&M capabilities. For instance, the system may provide Operator logs/rounds, Tool Management, Outage Risk Management, DCS Integration, Engineering Analysis Tools, Margin (Safety) Management, Advanced PRA Integration, Plant Chemistry, Fuel Management, Data Historian, Asset Management and Investment, Performance Measurement, Fleet Performance, Training, and/or Configuration Management.

Operator logs/rounds refer to inspecting and monitoring critical plant equipment and recording shift activities. This task type affects numerous workstreams in the integrated process model. The system uses wireless, RFID and other mobile technologies to automate these processes. Plants may have extensive RFID mapping, using NRC-approved technical architecture and security protocols. Technical interfaces may provide linkages, as appropriate, to functional teams including plant monitoring, engineering, work management or reliability programs for specific equipment issues. This is part of the integrated system vision for plant reliability improvement, as well as supporting expected staffing levels.

Tool Management refers to managing tool calibration, use and tracking. The system integrates tool management with the appropriate process teams, such as Work Management, planning and Supply Chain, so that specialized or calibrated tools are available, used and maintained (including records as required) to support plant activities. The system again deploys wireless, sensors and bar coding/RFID to improve the ability to manage tool inventory, resource scheduling and location at the site.

Outage Risk Management refers to managing plant risk during outage conditions. The scope of this capability could be quite broad and include the Point of View from both an operator and a Service Provider. This capability addresses the procedural aspects and automation tools to assess and evaluate core damage frequency (CDF) risks for plant configuration during outage maintenance activities. From the Operator's view, this ensures that regulatory requirements are met for minimum safety standards during plant outage work based on plant mode status. From the Service Provider's view, this provides another capability to help better pre-plan outage work activities using CDF as a key input.

DCS Integration refers to integrating Digital Control Systems with data historian, work management and equipment reliability programs. The system integrates real-time monitoring of plant components with maintenance and reliability functions (both engineering analysis and initiation of physical work on the component) with the objective of optimizing the timing of maintenance work and reducing/eliminating unplanned component outages.

Engineering Analysis Tools refer to installing engineering tools that support engineering programs and design control. Typical examples of engineering analysis tools include electrical loads, cable routing, structural analysis, motor operated valve analysis, diagnostic/monitoring, etc. This is an area of potential service opportunity to have service contracts to maintain the design basis information in these tools consistent with changes in plant configuration.

Margin (Safety) Management refers to implementing plant safety margin management program. The system captures the safety margins that have been built into the design process so that this is visible to engineers to use for impact assessment reviews, safety analyses, and operability assessments (when the components become operable).

Advanced PRA Integration refers to integrating PRA as a decision support tool for risk informed decision making. This functionality maintains the PRA consistent with actual plant configuration and procedures and to use the PRA as a key tool in operational, investment and design decisions. This may be effective when integrated with the advanced data and configuration management tools implemented in the system.

Plant Chemistry refers to managing plant chemistry control programs. This functionality adds analytical tools and procedural workflows to implement the plant chemistry management program.

Fuel Management refers to managing fuel procurement, conversion, enrichment and fabrication processes and workflow. This functionality adds analytical tools and procedural workflows to implement the fuels management program. This includes analytical tools provided by service provider for fuel burn and core reload analysis (e.g., optimization and fuel shuffle design).

Data Historian refers to recording and managing plant performance data using time series database. Applications, such as OSIsoft PI, are part of the system solution where the need for data historians is required, storing the data as transmitted by plant I&C, DCS or other sources. The system architecture assumes data historian net nodes that consolidate data historians across the fleet. This allows a centralized plant monitoring group to better correlate data across each plant. A series of monitoring capabilities are built atop this database, including process, condition and predictive monitoring. (Note that for a global EPR fleet, this time series database could be aggregated and correlated for all plants).

Asset Management and Investment refers to managing capital investments using asset investment risk and prioritization tools and methods. This functionality deploys prioritization methodology and financial tools to compare and optimize asset investments. This may include tools from a package such as Primavera, CopperLeaf or through other, more specialized asset management tools. The system leverages proprietary methods as the baseline for implementing this functionality.

Performance Measurement refers to establishing and implementing a key performance indicator (KPI) and performance review program for all site organizations and departments. The system is expected to provide the enterprise analytics capability for each organization and for key investment areas. The architecture and tool set is built around Microsoft Office SharePoint Server.

Fleet Performance refers to monitoring equipment, plant and fleet operations, reliability and performance. The system enables a centralized Fleet Control Center to provide 7×24 monitoring, diagnostics (including process, condition and predictive monitoring), functional coordination with key groups and issuing advisories for the fleet. This center provides remote monitoring and diagnostics for the fleet. Key personnel may access and view data using the Fleet Performance architecture illustrated in FIG. 15.

Figure 15:
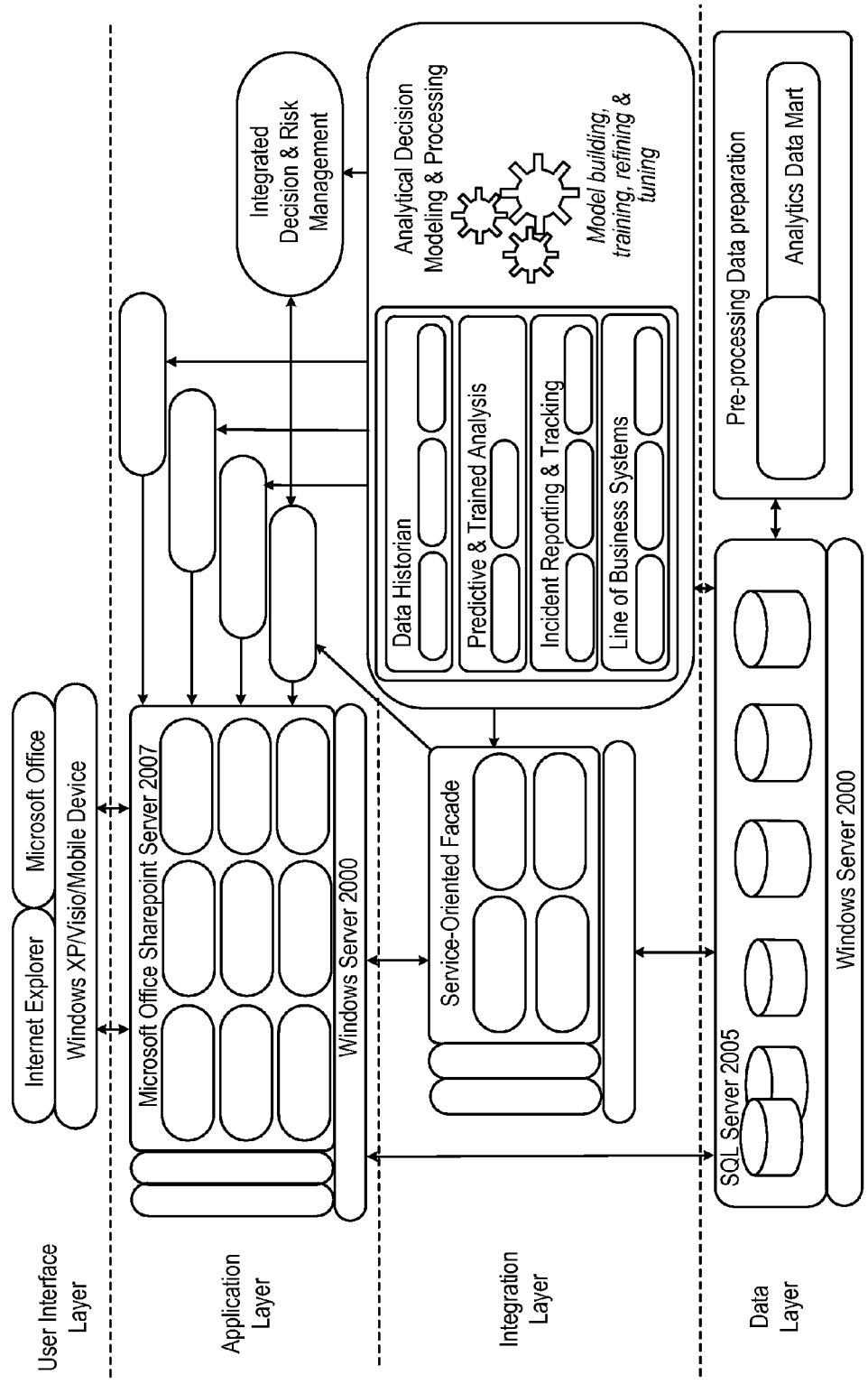
FIG. 15 is a diagram of an example performance architecture.

As shown in FIG. 15, the system may be architected with a four-level approach to reliability and performance: new plant; new plant fleet; existing plant; service provider. Each level may have access to key data. Key processes are modified to support each of these levels—for example, the baseline Equipment Reliability and AP913 processes are modified to show roles, responsibilities, actions of an outage service provider across the fleet.

All training materials may be hosted and delivered using the system. Any materials not directly provided by a supplier are developed using a system "learning content factory" concept. The system provides significant increases in the use of 3-D and other schematic data, due to the system having the complete data model controlled in Teamcenter. The system leverages its change control and configuration management capabilities to maintain alignment of training, work practices, and the plant simulator.1

Configuration Management during the O&M phase may broad and very encompassing
  the system may ensure complete synchronization between:
    the physical plant,
      the drawings, documents, and procedures that describe the plant and how it is to be operated, and
      the design and licensing basis upon which the plant license was granted.
  There are several tools, as described above, involved in the operation of the plants and that data backbone in the system may be managed and maintained throughout all plant configuration changes.

A number of analytical and data tools are included in the system environment and these are carefully managed to ensure that a single source of validated data exists. Some tools are "Authoring Tools", e.g., those tools that are used to create documents, analyses and records (e.g., engineering tools), some tools rely upon the data in the system to perform maintenance, engineering and reliability work (e.g., RCM tools), and some tools combine new data with system information to create new capabilities (e.g., real-time data monitoring combined with system equipment information to drive equipment maintenance).

Engineering change control may be applied to all physical, data and procedural changes to the plant, including I&C systems, to ensure the integrity of the configuration management process. This is accomplished through electronic workflows, data controls, drawing and analyses processes and procedural controls. The system may ensure that the plant simulator meets these requirements as well.

Figure 16:
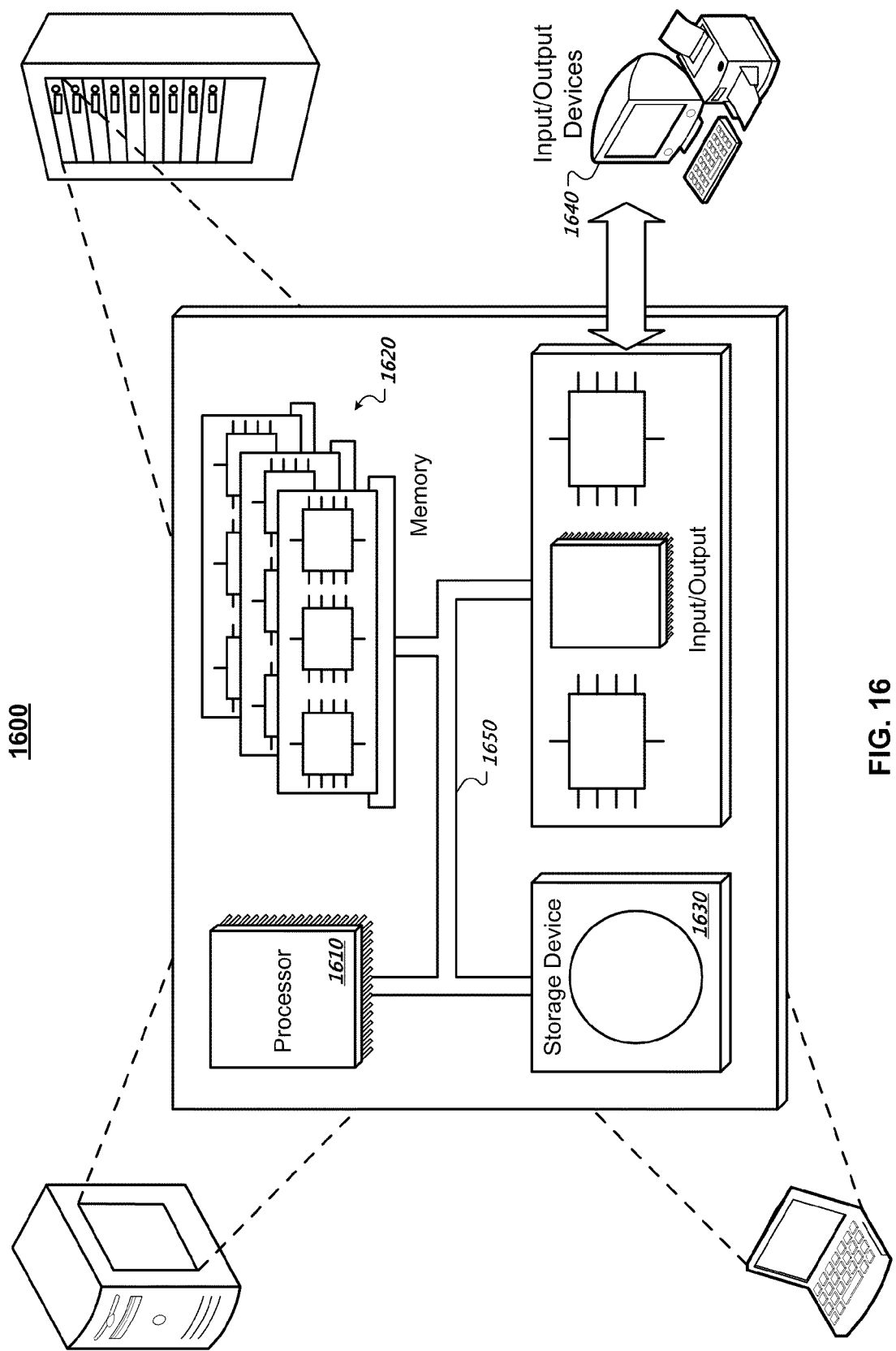

FIG. 16 is a schematic diagram of an example of a generic computer system 1600. The system 1600 may be part of the energy facility control system and used to implement techniques and processes described throughout this disclosure. The system 1600 includes a processor 1610, a memory 1620, a storage device 1630, and an input/output device 1640. Each of the components 1610, 1620, 1630, and 1640 are interconnected using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630 to display graphical information for a user interface on the input/output device 1640.

The memory 1620 stores information within the system 1600. In one implementation, the memory 1620 is a computer-readable medium. In another implementation, the memory 1620 is a volatile memory unit. In yet another implementation, the memory 1620 is a non-volatile memory unit.

The storage device 1630 is capable of providing mass storage for the system 1600. In one implementation, the storage device 1630 is a computer-readable medium. In various different implementations, the storage device 1630 may be a floppy disk device, a hard disk device, an optical disk device, or a tape device.

The input/output device 1640 provides input/output operations for the system 1600. In one implementation, the input/output device 1640 includes a keyboard and/or pointing device. In another implementation, the input/output device 1640 includes a display unit for displaying graphical user interfaces.

The features described can be implemented in digital electronic circuitry, or in computer hardware, or in combinations of computer hardware and firmware or software. The apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the disclosure.

What is claimed is:

1. An energy facility control system comprising:
a database configured to maintain documents that support an energy facility as collections of data objects, each of the data objects having one or more attributes that classify a type of data stored in the data object and the documents that support the energy facility including at least:
a license document that defines a licensing agreement between the energy facility and a regulatory organization and includes a first collection of the data objects that are managed as discrete pieces of data separate from the license document, the first collection of the data objects representing words, at least one image, and at least one computer-aided-design drawing that make up the license document, and
a design document that defines a design of at least a portion of the energy facility and includes a second collection of the data objects that are managed as discrete pieces of data separate from the design document, the second collection of the data objects representing words, at least one image, and at least one computer-aided-design drawing that make up the design document; and
one or more server systems that are configured to access data stored in the database and to perform operations comprising:
reusing data objects among the documents that support the energy facility, the reuse including reusing, in the license document and the design document, a first data object that includes data describing a component of the energy facility by:
including the first data object in the first collection of data objects that define the license document,
including the first data object in the second collection of data objects that define the design document, and
maintaining, in the database, a single stored instance of the first data object that is referenced by each of the license document and the design document, the first data object representing at least one of words describing the component, an image of the component, and a computer-aided-design drawing of the component; and
processing transactions related to the energy facility using the data objects as opposed to the documents, the processing including:
identifying impacted data objects that are relevant to a transaction based on the one or more attributes of each of the data objects, the identified data objects being included in multiple, different documents that support the energy facility, and
handling the transaction using the identified data objects without accessing all data from the multiple, different documents that support the energy facility.

2. The energy facility control system of claim 1:
wherein the first data object that includes data describing the component of the energy facility comprises a computer-aided-design (CAD) drawing of the component of the energy facility;
wherein including the first data object in the first collection of data objects that define the license document comprises including the CAD drawing of the component in the first collection of data objects that define the license document such that the CAD drawing of the component is presented in the license document;
wherein including the first data object in the second collection of data objects that define the design document comprises including the CAD drawing of the component in the second collection of data objects that define the design document such that the CAD drawing of the component is presented in the design document, and
wherein maintaining, in the database, the single stored instance of the first data object that is referenced by each of the license document and the design document comprises maintaining, in the database, a single stored instance of the CAD drawing of the component that is referenced by each of the license document and the design document.

3. The energy facility control system of claim 1, wherein the operations performed by the one or more server systems further comprise processing modifications to the first data object by modifying the single stored instance of the first data object that is referenced by each of the license document and the design document, the modifications to the first data object being reflected in each of the license document and the design document based on modification of the single stored instance of the first data object.

4. The energy facility control system of claim 1, wherein processing transactions related to the energy facility using the data objects as opposed to the documents comprises:
   identifying a transaction related to reusing portions of the license document in another license document that defines a different licensing agreement than the licensing agreement defined by the license document;
   in response to identifying the transaction related to reusing portions of the license document in another license document, identifying data objects included in the first collection of data objects that do not pertain to energy facility specific data based on attributes of the first collection of data objects;
   accessing the identified data objects that do not pertain to energy facility specific data; and
   using the identified data objects that do not pertain to energy facility specific data in handling the transaction related to reusing portions of the license document in another license document.

5. The energy facility control system of claim 1:
   wherein the transaction is a request to change the component of the energy facility described by the first data object;
   wherein identifying impacted data objects that are relevant to the transaction comprises:
      isolating, from the license document, a licensed safety margin data object that describes a licensed safety margin that is impacted by the component of the energy facility, and
      isolating, from the design document, a designed safety margin data object that describes a designed safety margin that is impacted by the component of the energy facility; and
   wherein handling the transaction using the identified data objects without accessing all data from the multiple, different documents that support the energy facility comprises handling the request to change the component of the energy facility using the licensed safety margin data object and the designed safety margin data object.

6. The energy facility control system of claim 1:
   wherein the transaction is an adverse condition of the energy facility detected by a corrective action application;
   wherein identifying impacted data objects that are relevant to the transaction comprises, based on the one or more attributes of each of the data objects, identifying impacted data objects that are relevant to the adverse condition of the energy facility detected by the corrective action application, the identified data objects being associated with at least licensing and design operations related to the energy facility and including at least one data object included in the first collection of data objects and at least one data object included in the second collection of data objects; and
   wherein handling the transaction using the identified data objects without accessing all data from the multiple, different documents that support the energy facility comprises handling the adverse condition of the energy facility detected by the corrective action application using the identified data objects associated with at least licensing and design operations related to the energy facility.

7. The energy facility control system of claim 1:
   wherein the documents that support the energy facility include:
      an as licensed system requirements document that defines system requirements needed to comply with the licensing agreement and includes a third collection of the data objects that are managed as discrete pieces of data separate from the as licensed system requirements document,
      an as designed system requirements document that defines system requirements needed to comply with a design of the energy facility and includes a fourth collection of the data objects that are managed as discrete pieces of data separate from the as designed system requirements document,
      an as built system requirements document that defines system requirements for the energy facility as built and includes a fifth collection of the data objects that are managed as discrete pieces of data separate from the as built system requirements document, and
      an as maintained system requirements document that defines system requirements for the energy facility as maintained throughout its lifecycle and includes a sixth collection of the data objects that are managed as discrete pieces of data separate from the as maintained system requirements document;
   wherein the transaction is a change in the energy facility;
   wherein identifying impacted data objects that are relevant to the transaction comprises, based on the one or more attributes of each of the data objects, identifying, from among the third, fourth, fifth, and sixth collections of data objects, impacted data objects that are relevant to the change in the energy facility, the identified data objects including at least one data object included in the third collection of data objects, at least one data object included in the fourth collection of data objects, at least one data object included in the fifth collection of data objects, and at least one data object included in the sixth collection of data objects; and
   wherein handling the transaction using the identified data objects without accessing all data from the multiple, different documents that support the energy facility comprises using a configuration management application to, based on the identified data objects, assess impact of the change in the energy facility on the energy facility as licensed, as designed, as built, and as maintained.

8. The energy facility control system of claim 1, wherein the database is configured to maintain the documents that support the energy facility as collections of extensible markup language (XML) data objects defined in accordance with an XML schema.

9. The energy facility control system of claim 1:
   wherein the database is configured to maintain documents that support a nuclear power plant as collections of data objects;
   wherein the license document defines a licensing agreement between the nuclear power plant and a nuclear regulatory organization and includes a first collection of the data objects that are managed as discrete pieces of data separate from the license document;

wherein the design document defines a design of at least a portion of the nuclear power plant and includes a second collection of the data objects that are managed as discrete pieces of data separate from the design document;

wherein reusing data objects among the documents that support the energy facility comprises reusing data objects among the documents that support the nuclear power plant; and wherein processing transactions related to the energy facility using the data objects as opposed to the documents comprises processing transactions related to the nuclear power plant using the data objects as opposed to the documents.

10. A method comprising:

maintaining, in a database, documents that support an energy facility as collections of data objects, each of the data objects having one or more attributes that classify a type of data stored in the data object and the documents that support the energy facility including at least:

a license document that defines a licensing agreement between the energy facility and a regulatory organization and includes a first collection of the data objects that are managed as discrete pieces of data separate from the license document, the first collection of the data objects representing words, at least one image, and at least one computer-aided-design drawing that make up the license document, and a design document that defines a design of at least a portion of the energy facility and includes a second collection of the data objects that are managed as discrete pieces of data separate from the design document, the second collection of the data objects representing words, at least one image, and at least one computer-aided-design drawing that make up the design document; and reusing, by one or more server systems, data objects among the documents that support the energy facility, the reuse including reusing, in the license document and the design document, a first data object that includes data describing a component of the energy facility by:

including the first data object in the first collection of data objects that define the license document, including the first data object in the second collection of data objects that define the design document, and maintaining, in the database, a single stored instance of the first data object that is referenced by each of the license document and the design document, the first data object representing at least one of words describing the component, an image of the component, and a computer-aided-design drawing of the component; and processing, by one or more server systems, transactions related to the energy facility using the data objects as opposed to the documents, the processing including:

identifying impacted data objects that are relevant to a transaction based on the one or more attributes of each of the data objects, the identified data objects being included in multiple, different documents that support the energy facility, and handling the transaction using the identified data objects without accessing all data from the multiple, different documents that support the energy facility.

11. The method of claim 10:

wherein the first data object that includes data describing the component of the energy facility comprises a computer-aided-design (CAD) drawing of the component of the energy facility;

wherein including the first data object in the first collection of data objects that define the license document comprises including the CAD drawing of the component in the first collection of data objects that define the license document such that the CAD drawing of the component is presented in the license document;

wherein including the first data object in the second collection of data objects that define the design document comprises including the CAD drawing of the component in the second collection of data objects that define the design document such that the CAD drawing of the component is presented in the design document, and wherein maintaining, in the database, the single stored instance of the first data object that is referenced by each of the license document and the design document comprises maintaining, in the database, a single stored instance of the CAD drawing of the component that is referenced by each of the license document and the design document.

12. The method of claim 10, further comprising processing modifications to the first data object by modifying the single stored instance of the first data object that is referenced by each of the license document and the design document, the modifications to the first data object being reflected in each of the license document and the design document based on modification of the single stored instance of the first data object.

13. The method of claim 10, wherein processing transactions related to the energy facility using the data objects as opposed to the documents comprises:

identifying a transaction related to reusing portions of the license document in another license document that defines a different licensing agreement than the licensing agreement defined by the license document;

in response to identifying the transaction related to reusing portions of the license document in another license document, identifying data objects included in the first collection of data objects that do not pertain to energy facility specific data based on attributes of the first collection of data objects;

accessing the identified data objects that do not pertain to energy facility specific data; and using the identified data objects that do not pertain to energy facility specific data in handling the transaction related to reusing portions of the license document in another license document.

14. The method of claim 10:

wherein the transaction is a request to change the component of the energy facility described by the first data object;

wherein identifying impacted data objects that are relevant to the transaction comprises:

isolating, from the license document, a licensed safety margin data object that describes a licensed safety margin that is impacted by the component of the energy facility, and isolating, from the design document, a designed safety margin data object that describes a designed safety margin that is impacted by the component of the energy facility; and wherein handling the transaction using the identified data objects without accessing all data from the multiple, different documents that support the energy facility comprises handling the request to change the component of the energy facility using the licensed safety margin data object and the designed safety margin data object.

15. The method of claim 10:
wherein the transaction is an adverse condition of the energy facility detected by a corrective action application;
wherein identifying impacted data objects that are relevant to the transaction comprises, based on the one or more attributes of each of the data objects, identifying impacted data objects that are relevant to the adverse condition of the energy facility detected by the corrective action application, the identified data objects being associated with at least licensing and design operations related to the energy facility and including at least one data object included in the first collection of data objects and at least one data object included in the second collection of data objects; and
wherein handling the transaction using the identified data objects without accessing all data from the multiple, different documents that support the energy facility comprises handling the adverse condition of the energy facility detected by the corrective action application using the identified data objects associated with at least licensing and design operations related to the energy facility.

16. The method of claim 10:
wherein the documents that support the energy facility include:
an as licensed system requirements document that defines system requirements needed to comply with the licensing agreement and includes a third collection of the data objects that are managed as discrete pieces of data separate from the as licensed system requirements document,
an as designed system requirements document that defines system requirements needed to comply with a design of the energy facility and includes a fourth collection of the data objects that are managed as discrete pieces of data separate from the as designed system requirements document,
an as built system requirements document that defines system requirements for the energy facility as built and includes a fifth collection of the data objects that are managed as discrete pieces of data separate from the as built system requirements document, and
an as maintained system requirements document that defines system requirements for the energy facility as maintained throughout its lifecycle and includes a sixth collection of the data objects that are managed as discrete pieces of data separate from the as maintained system requirements document;
wherein the transaction is a change in the energy facility;
wherein identifying impacted data objects that are relevant to the transaction comprises, based on the one or more attributes of each of the data objects, identifying, from among the third, fourth, fifth, and sixth collections of data objects, impacted data objects that are relevant to the change in the energy facility, the identified data objects including at least one data object included in the third collection of data objects, at least one data object included in the fourth collection of data objects, at least one data object included in the fifth collection of data objects, and at least one data object included in the sixth collection of data objects; and wherein handling the transaction using the identified data objects without accessing all data from the multiple, different documents that support the energy facility comprises using a configuration management application to, based on the identified data objects, assess impact of the change in the energy facility on the energy facility as licensed, as designed, as built, and as maintained.

17. The method of claim 10, wherein the database is configured to maintain the documents that support the energy facility as collections of extensible markup language (XML) data objects defined in accordance with an XML schema.

18. The method of claim 10:
wherein the database is configured to maintain documents that support a nuclear power plant as collections of data objects;
wherein the license document defines a licensing agreement between the nuclear power plant and a nuclear regulatory organization and includes a first collection of the data objects that are managed as discrete pieces of data separate from the license document;
wherein the design document defines a design of at least a portion of the nuclear power plant and includes a second collection of the data objects that are managed as discrete pieces of data separate from the design document;
wherein reusing data objects among the documents that support the energy facility comprises reusing data objects among the documents that support the nuclear power plant; and
wherein processing transactions related to the energy facility using the data objects as opposed to the documents comprises processing transactions related to the nuclear power plant using the data objects as opposed to the documents.

19. At least one non-transitory computer-readable storage medium encoded with executable instructions that, when executed by at least one processor, cause the at least one processor to perform operations comprising:
maintaining, in a database, documents that support an energy facility as collections of data objects, each of the data objects having one or more attributes that classify a type of data stored in the data object and the documents that support the energy facility including at least:
a license document that defines a licensing agreement between the energy facility and a regulatory organization and includes a first collection of the data objects that are managed as discrete pieces of data separate from the license document, the first collection of the data objects representing words, at least one image, and at least one computer-aided-design drawing that make up the license document, and
a design document that defines a design of at least a portion of the energy facility and includes a second collection of the data objects that are managed as discrete pieces of data separate from the design document, the second collection of the data objects representing words, at least one image, and at least one computer-aided-design drawing that make up the design document; and
reusing data objects among the documents that support the energy facility, the reuse including reusing, in the license document and the design document, a first data object that includes data describing a component of the energy facility by:
including the first data object in the first collection of data objects that define the license document, including the first data object in the second collection of data objects that define the design document, and maintaining, in the database, a single stored instance of the first data object that is referenced by each of the license document and the design document, the first data object representing at least one of words describing the component, an image of the component, and a computer-aided-design drawing of the component; and processing transactions related to the energy facility using the data objects as opposed to the documents, the processing including:

identifying impacted data objects that are relevant to a transaction based on the one or more attributes of each of the data objects, the identified data objects being included in multiple, different documents that support the energy facility, and handling the transaction using the identified data objects without accessing all data from the multiple, different documents that support the energy facility.

20. The at least one computer-readable storage medium of claim 19:

wherein the first data object that includes data describing the component of the energy facility comprises a computer-aided-design (CAD) drawing of the component of the energy facility;

wherein including the first data object in the first collection of data objects that define the license document comprises including the CAD drawing of the component in the first collection of data objects that define the license document such that the CAD drawing of the component is presented in the license document;

wherein including the first data object in the second collection of data objects that define the design document comprises including the CAD drawing of the component in the second collection of data objects that define the design document such that the CAD drawing of the component is presented in the design document, and wherein maintaining, in the database, the single stored instance of the first data object that is referenced by each of the license document and the design document comprises maintaining, in the database, a single stored instance of the CAD drawing of the component that is referenced by each of the license document and the design document.

\* \* \* \* \*

UNITED STATES PATENT AND TRADEMARK OFFICE
CERTIFICATE OF CORRECTION

PATENT NO. : 8,606,548 B2
APPLICATION NO. : 12/965483
DATED : December 10, 2013
INVENTOR(S) : Webster et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 305 days.

Signed and Sealed this
Twenty-third Day of May, 2017

Michelle K. Lee
*Director of the United States Patent and Trademark Office*